US008892674B2

(12) United States Patent
Horvitz

(10) Patent No.: US 8,892,674 B2
(45) Date of Patent: *Nov. 18, 2014

(54) INTEGRATION OF A COMPUTER-BASED MESSAGE PRIORITY SYSTEM WITH MOBILE ELECTRONIC DEVICES

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/258,749

(22) Filed: Oct. 27, 2008

(65) Prior Publication Data

US 2009/0119385 A1    May 7, 2009

Related U.S. Application Data

(63) Continuation of application No. 10/795,695, filed on Mar. 8, 2004, now Pat. No. 7,444,384, which is a continuation of application No. 09/365,293, filed on Jul. 30, 1999, now Pat. No. 6,714,967.

(51) Int. Cl.
*G06F 15/16* (2006.01)
*H04L 12/58* (2006.01)
*G06Q 10/10* (2012.01)

(52) U.S. Cl.
CPC ............ *H04L 12/587* (2013.01); *H04L 12/5885* (2013.01); *G06Q 10/107* (2013.01); *H04L 12/585* (2013.01); *H04L 51/24* (2013.01); *H04L 51/26* (2013.01)
USPC .......................................... 709/207; 709/206

(58) Field of Classification Search
CPC ..... H04L 12/58; H04L 12/581; H04L 12/585; H04L 12/587; H04L 12/5855; H04L 12/5875; H04L 12/5885; H04L 51/24; H04L 51/26; H04L 67/02; H04L 67/06; H04L 29/06408
USPC .................................................. 709/206, 207
See application file for complete search history.

(56) References Cited

U.S. PATENT DOCUMENTS 4,570,227 A    2/1986    Tachi et al.
4,971,434 A    11/1990    Ball
(Continued)

FOREIGN PATENT DOCUMENTS

JP    06120978 A    4/1994
JP    08-140158 A    5/1996
(Continued)

OTHER PUBLICATIONS

U.S. Appl. No. 09/007,894, filed Jan. 15, 1998, Horvitz.
(Continued)

*Primary Examiner* — Thu Ha Nguyen
(74) *Attorney, Agent, or Firm* — Steve Wight; Peter Taylor; Micky Minhas

(57) ABSTRACT

Methods for integrating mobile electronic devices with computational methods for assigning priorities to documents are disclosed. In one embodiment, a computer-implemented method first receives a new document such as an electronic mail message. The method assigns a priority to the document, based on a text classifier such as a Bayesian classifier or a support-vector machine classifier. The method then alerts a user on an electronic device, such as a pager or a cellular phone, based on an alert criteria that can be made sensitive to information about the location, inferred task, and focus of attention of the user. Such information can be inferred under uncertainty or can be accessed directly from online information sources. One embodiment makes use of information from an online calendar to control the criteria used to make decisions about relaying information to a mobile device.

20 Claims, 15 Drawing Sheets

(56) References Cited

U.S. PATENT DOCUMENTS

| | | | |
|---|---|---|---|
| 5,077,668 A | 12/1991 | Doi | |
| 5,179,519 A | 1/1993 | Adachi et al. | |
| 5,220,507 A | 6/1993 | Kirson | |
| 5,377,354 A | 12/1994 | Scannell et al. | |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,608,635 A | 3/1997 | Tamai | |
| 5,611,050 A | 3/1997 | Theimer et al. | |
| 5,617,526 A | 4/1997 | Oran et al. | |
| 5,634,084 A | 5/1997 | Malsheen et al. | |
| 5,671,333 A | 9/1997 | Catlett et al. | |
| 5,675,733 A | 10/1997 | Williams | |
| 5,694,616 A | 12/1997 | Johnson et al. | |
| 5,812,865 A | 9/1998 | Theimer et al. | |
| 5,835,881 A | 11/1998 | Trovato et al. | |
| 5,864,848 A | 1/1999 | Horvitz | |
| 5,905,863 A | 5/1999 | Knowles et al. | |
| 5,907,839 A | 5/1999 | Roth | |
| 5,911,773 A | 6/1999 | Mutsuga et al. | |
| 5,935,218 A | 8/1999 | Beyda et al. | |
| 5,950,187 A | 9/1999 | Tsuda | |
| 5,974,465 A | 10/1999 | Wong | |
| 5,978,837 A | 11/1999 | Foladare et al. | |
| 5,995,597 A | 11/1999 | Woltz et al. | |
| 6,021,403 A | 2/2000 | Horvitz | |
| 6,034,970 A | 3/2000 | Levac et al. | |
| 6,067,565 A | 5/2000 | Horvitz | |
| 6,073,165 A | 6/2000 | Narasimhan et al. | |
| 6,078,865 A | 6/2000 | Koyanagi | |
| 6,085,216 A | 7/2000 | Huberman et al. | |
| 6,101,531 A | 8/2000 | Eggleston et al. | |
| 6,119,065 A | 9/2000 | Shimada et al. | |
| 6,144,942 A * | 11/2000 | Ruckdashel | 705/9 |
| 6,147,977 A * | 11/2000 | Thro et al. | 370/265 |
| 6,151,623 A * | 11/2000 | Harrison et al. | 709/206 |
| 6,161,130 A | 12/2000 | Horvitz et al. | |
| 6,182,059 B1 | 1/2001 | Angotti et al. | |
| 6,182,133 B1 * | 1/2001 | Horvitz | 709/223 |
| 6,185,603 B1 | 2/2001 | Henderson et al. | |
| 6,189,027 B1 | 2/2001 | Haneda et al. | |
| 6,192,360 B1 | 2/2001 | Dumais et al. | |
| 6,195,533 B1 | 2/2001 | Tkatch et al. | |
| 6,212,265 B1 | 4/2001 | Duphorne | |
| 6,216,165 B1 | 4/2001 | Woltz et al. | |
| 6,233,430 B1 | 5/2001 | Helferich | |
| 6,267,733 B1 | 7/2001 | Peterson et al. | |
| 6,282,565 B1 | 8/2001 | Shaw et al. | |
| 6,298,304 B1 | 10/2001 | Theimer | |
| 6,317,592 B1 | 11/2001 | Campana, Jr. et al. | |
| 6,321,158 B1 | 11/2001 | DeLorme et al. | |
| 6,327,581 B1 | 12/2001 | Platt | |
| 6,339,746 B1 | 1/2002 | Sugiyama et al. | |
| 6,353,398 B1 | 3/2002 | Amin et al. | |
| 6,370,526 B1 | 4/2002 | Agrawal et al. | |
| 6,381,735 B1 | 4/2002 | Hunt | |
| 6,385,662 B1 | 5/2002 | Moon et al. | |
| 6,396,513 B1 | 5/2002 | Helfman et al. | |
| 6,408,277 B1 | 6/2002 | Nelken | |
| 6,411,930 B1 | 6/2002 | Burges | |
| 6,411,947 B1 | 6/2002 | Rice et al. | |
| 6,421,708 B2 | 7/2002 | Bettis | |
| 6,421,709 B1 | 7/2002 | McCormick et al. | |
| 6,424,995 B1 | 7/2002 | Shuman | |
| 6,442,589 B1 | 8/2002 | Takahashi et al. | |
| 6,466,232 B1 | 10/2002 | Newell et al. | |
| 6,477,460 B2 | 11/2002 | Kepler | |
| 6,484,197 B1 | 11/2002 | Donohue | |
| 6,490,574 B1 | 12/2002 | Bennett et al. | |
| 6,505,150 B2 | 1/2003 | Nunberg et al. | |
| 6,505,167 B1 | 1/2003 | Horvitz et al. | |
| 6,507,866 B1 * | 1/2003 | Barchi | 709/207 |
| 6,513,026 B1 | 1/2003 | Horvitz et al. | |
| 6,513,046 B1 | 1/2003 | Abbott, III et al. | |
| 6,526,350 B2 | 2/2003 | Sekiyama | |
| 6,532,489 B1 | 3/2003 | Merchant | |
| 6,549,915 B2 | 4/2003 | Abbott, III et al. | |
| 6,549,944 B1 * | 4/2003 | Weinberg et al. | 709/224 |
| 6,553,358 B1 | 4/2003 | Horvitz | |
| 6,557,036 B1 | 4/2003 | Kavacheri et al. | |
| 6,584,502 B1 | 6/2003 | Natarajan et al. | |
| 6,618,716 B1 | 9/2003 | Horvitz | |
| 6,622,089 B2 | 9/2003 | Hasegawa et al. | |
| 6,622,160 B1 | 9/2003 | Horvitz | |
| 6,629,123 B1 | 9/2003 | Hunt | |
| 6,672,506 B2 | 1/2004 | Swartz et al. | |
| 6,694,252 B2 | 2/2004 | Ukita | |
| 6,714,967 B1 | 3/2004 | Horvitz | |
| 6,728,635 B2 | 4/2004 | Hamada et al. | |
| 6,732,148 B1 | 5/2004 | Estrada et al. | |
| 6,732,149 B1 | 5/2004 | Kephart | |
| 6,741,188 B1 | 5/2004 | Miller et al. | |
| 6,747,675 B1 | 6/2004 | Abbott et al. | |
| 6,748,225 B1 | 6/2004 | Kepler | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,837,436 B2 | 1/2005 | Swartz et al. | |
| 6,842,877 B2 | 1/2005 | Robarts et al. | |
| 6,886,002 B2 | 4/2005 | Horvitz | |
| 6,898,518 B2 | 5/2005 | Padmanabhan | |
| 6,944,278 B1 | 9/2005 | Nielsen | |
| 6,952,647 B2 | 10/2005 | Hasegawa et al. | |
| 6,980,993 B2 | 12/2005 | Horvitz et al. | |
| 7,003,525 B1 | 2/2006 | Horvitz et al. | |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,103,473 B2 | 9/2006 | Ranjan | |
| 7,120,865 B1 | 10/2006 | Horvitz et al. | |
| 7,171,378 B2 | 1/2007 | Petrovich et al. | |
| 7,195,157 B2 | 3/2007 | Swartz et al. | |
| 7,233,933 B2 | 6/2007 | Horvitz et al. | |
| 7,233,954 B2 * | 6/2007 | Horvitz | 707/101 |
| 7,337,181 B2 | 2/2008 | Horvitz | |
| 7,385,501 B2 | 6/2008 | Miller et al. | |
| 7,409,423 B2 | 8/2008 | Horvitz et al. | |
| 7,502,828 B2 * | 3/2009 | Gardner | 709/206 |
| 7,565,403 B2 | 7/2009 | Horvitz et al. | |
| 7,664,249 B2 | 2/2010 | Horvitz et al. | |
| 7,689,521 B2 | 3/2010 | Nodelman et al. | |
| 7,743,340 B2 | 6/2010 | Horvitz et al. | |
| 7,797,267 B2 | 9/2010 | Horvitz | |
| 7,844,666 B2 | 11/2010 | Horvitz et al. | |
| 7,877,686 B2 | 1/2011 | Abbott et al. | |
| 7,925,706 B2 * | 4/2011 | Glickstein | 709/206 |
| 7,975,015 B2 | 7/2011 | Horvitz et al. | |
| 8,024,415 B2 | 9/2011 | Horvitz et al. | |
| 8,050,801 B2 * | 11/2011 | Richards et al. | 700/276 |
| 8,229,425 B2 * | 7/2012 | Salomone | 455/434 |
| 8,443,441 B2 * | 5/2013 | Stolfo et al. | 726/22 |
| 2001/0007968 A1 | 7/2001 | Shimazu | |
| 2001/0025223 A1 | 9/2001 | Geiger et al. | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0042087 A1 | 11/2001 | Kephart et al. | |
| 2001/0043231 A1 | 11/2001 | Abbott et al. | |
| 2001/0043232 A1 | 11/2001 | Abbott et al. | |
| 2002/0002450 A1 | 1/2002 | Nunberg et al. | |
| 2002/0007356 A1 | 1/2002 | Rice et al. | |
| 2002/0032689 A1 | 3/2002 | Abbott, III et al. | |
| 2002/0038294 A1 | 3/2002 | Matsugu | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054117 A1 | 5/2002 | van Dantzich et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |

(56) References Cited

U.S. PATENT DOCUMENTS

| | | | |
|---|---|---|---|
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0087649 A1 | 7/2002 | Horvitz | |
| 2002/0099817 A1 | 7/2002 | Abbott et al. | |
| 2002/0154210 A1 | 10/2002 | Ludwig et al. | |
| 2002/0159575 A1* | 10/2002 | Skladman et al. | 379/93.24 |
| 2002/0164998 A1 | 11/2002 | Younis | |
| 2002/0173905 A1 | 11/2002 | Jin et al. | |
| 2002/0183823 A1 | 12/2002 | Pappu | |
| 2002/0191034 A1 | 12/2002 | Sowizral et al. | |
| 2003/0014491 A1 | 1/2003 | Horvitz et al. | |
| 2003/0023571 A1 | 1/2003 | Barnhill | |
| 2003/0046401 A1 | 3/2003 | Abbott et al. | |
| 2003/0154476 A1 | 8/2003 | Abbott, III et al. | |
| 2003/0167311 A1 | 9/2003 | Kirsch | |
| 2003/0182052 A1 | 9/2003 | DeLorme et al. | |
| 2003/0182383 A1* | 9/2003 | He | 709/206 |
| 2003/0212646 A1 | 11/2003 | Horvitz | |
| 2004/0015557 A1 | 1/2004 | Horvitz | |
| 2004/0070602 A1 | 4/2004 | Kobuya et al. | |
| 2004/0172483 A1 | 9/2004 | Horvitz | |
| 2004/0201500 A1 | 10/2004 | Miller et al. | |
| 2004/0267893 A1* | 12/2004 | Lin | 709/207 |
| 2005/0034078 A1 | 2/2005 | Abbott et al. | |
| 2005/0081059 A1 | 4/2005 | Bandini et al. | |
| 2005/0114207 A1* | 5/2005 | Jania | 705/14 |
| 2005/0165824 A1* | 7/2005 | Farnham et al. | 707/102 |
| 2005/0266858 A1 | 12/2005 | Miller et al. | |
| 2005/0272442 A1 | 12/2005 | Miller et al. | |
| 2006/0019676 A1 | 1/2006 | Miller et al. | |
| 2006/0031062 A1 | 2/2006 | Bakis et al. | |
| 2006/0041583 A1 | 2/2006 | Horvitz | |
| 2006/0212220 A1 | 9/2006 | Bou-Ghannam et al. | |
| 2006/0271277 A1 | 11/2006 | Hu et al. | |
| 2007/0011314 A1 | 1/2007 | Horvitz et al. | |
| 2007/0271504 A1 | 11/2007 | Horvitz | |
| 2008/0090591 A1 | 4/2008 | Miller et al. | |
| 2008/0091537 A1 | 4/2008 | Miller et al. | |
| 2008/0161018 A1 | 7/2008 | Miller et al. | |
| 2009/0006574 A1 | 1/2009 | Horvitz et al. | |
| 2009/0013052 A1 | 1/2009 | Robarts et al. | |
| 2009/0013374 A1* | 1/2009 | Tsai | 726/1 |
| 2009/0094240 A1* | 4/2009 | Bordeaux et al. | 707/7 |
| 2009/0132658 A1* | 5/2009 | Glickstein | 709/206 |
| 2011/0071964 A1 | 3/2011 | Horvitz | |

FOREIGN PATENT DOCUMENTS

| | | |
|---|---|---|
| JP | 10283291 A | 10/1998 |
| JP | 11-032144 A | 2/1999 |
| WO | 9800787 | 1/1998 |
| WO | WO-9825195 A2 | 6/1998 |
| WO | 9837680 A2 | 8/1998 |

OTHER PUBLICATIONS

U.S. Appl. No. 09/055,477, filed Apr. 6, 1998, Horvitz.
Final Office Action in U.S. Appl. No. 09/365,293 dated Jun. 26, 2003, 22 pages.
Non Final Office Action in U.S. Appl. No. 09/365,293 dated Feb. 5, 2003, 20 pages.
Final Office Action in U.S. Appl. No. 09/365,293 dated Aug. 23, 2002, 20 pages.
Final Office Action in U.S. Appl. No. 10/795,695 dated Jan. 4, 2007, 27 pages.
Non Final Office Action in U.S. Appl. No. 10/795,695 dated Dec. 17, 2007, 23 pages.
Non Final Office Action in U.S. Appl. No. 10/795,695 dated Jul. 27, 2006, 28 pages.
J. Breese, et al., Empirical Analysis of Predictive Algorithm for Collaborative Filtering, Proceedings of the 14th Conference on Uncertainty in Artificial Intelligence, 1998, pp. 43-52, AUAI, Moran Kaufmann, San Francisco.
M. Czerwinski, et al., Visualizing Implicit Queries for Information Management and Retrieval, Proceedings of CHI'99 ACM SIGCHI Conference on Human Factors in Computing Systems, 1999, pp. 560-567, Pittsburgh, PA.
S. Dumais, et al., Inductive Learning Algorithms and Representations for Text Categorization, Proceedings of the 7th Internat'l. Conference on Information and Knowledge Management, 1998, pp. 148-155, ACM Press, New York.
E. Horvitz, Principles of Mixed-Initiative User Interfaces, Proceedings of CHI'99 ACM SIGCHI Conference on Human Factors in Computing Systems, 1999, pp. 159-166, Pittsburgh, PA.
E. Horvitz, et al., Display of Information for Time-Critical Decision Making, Proceedings of the 11th Conference on Uncertainty in Artificial Intelligence, 1995, pp. 296-305, Montreal Canada, Morgan Kaufmann, San Francisco.
E. Horvitz, et al., The Lumiere Project: Bayesian User Modeling for Inferring the Goals and Needs of Software Users, Proceedings of the 14th Conference on Uncertainty in Artificial Intelligence, 1998, pp. 256-265, Morgan Kaufmann, San Francisco.
E. Horvitz, et al., Time-Dependent Utility and Action Under Uncertainty, Proceedings of 7th Conference on Uncertainty in Artificial Intelligence, 1991, pp. 151-158, Los Angeles, CA, Morgan Kaufmann, San Francisco.
E. Horvitz, et al., Time-Critical Action: Representations and Application, Proceedings of the 13th Conference on Uncertainty in Artificial Intelligence (UAI'97), 1997, pp. 250-257, Providence, RI, Morgan Kaufmann, San Francisco.
D. Koller, et al., Toward Optimal Feature Selection, Proceedings of 13th Conference on Machine Learning, 1996,, pp. 284-292, Morgan Kaufmann, San Francisco.
H. Leiberman, An Agent that Assist Web Browsing, Proceedings of IJCAI-95, 1995, Montreal, Canada, Morgan Kaufmann, San Francisco.
J. Platt, Fast Training of Support Vector Machines Using Sequential Minimal Optimization, Advances in Kernal Methods: Support Vector Learning, 1999, MIT Press, Cambridge, MA.
J. Platt, Probabilistic Outputs for Support Vector Machines and Comparison to Regularized Likelihood Methods, Advances in Large Margin Classifiers, 1999, MIT Press, Cambridge, MA.
M. Sahami, et al., A Bayesian Approach to Filtering Junk E-Mail, Workshop on Learning for Text Categorization, AAAI Technical Report WS-'98-05, 1998, American Assn. for Artificial Intelligence, AAAI.
Non Final Office Action in U.S. Appl. No. 10/795,695 dated Jun. 22, 2007, 20 pages.
Habel. "Incremental Generation of Multimodal Route Instructions," http://www.cs.niu.edu/~nlgdial/final/SS703CHabel.pdf, last access Dec. 11, 2006, 8 pages, Hamburg, Germany.
Eugenio, et al. "Generating driving directions for intelligent vehicles interfaces," 12th IEEE International Conference and Workshops on the Engineering of Computer-Based Systems, 2005, 8 pages.
"MapmyIndia Rocks Indian Web2.0 with GoogleMap Type Digitised Mapping," http://www.webyantra.net/tag/mashup/, last accessed Mar. 16, 2007, 7 pages.
Koleszar. "A Landmark-Based Location Reference Grid for Street Maps," http://stinet.dtic.mil/oai/oai?&verb=getRecord&metadataPrefix=html&identifier=ADA070048, Defense Technical Information Center, Jun. 1, 1979, 1 pages.
"PDA Toshiba," http://www.citynotebookcentre.com.au/Products/PDA&CELL/Toshiba/toshiba_pda_e740.htm, last accessed Mar. 16, 2007, 3 pages.
Hampe et al. "Integrating topographic information and landmarks for mobile navigation," http://www.ikg.uni-hannover.de/publikationen/publikationen/2003/wien_hampe_elias.pdf, last accessed Mar. 14, 2007, 13 pages.
May et al. "Presence and Quality of Navigational Landmarks: Effect on Driver Performance and Implications for Design," http://magpie.lboro.ac.uk/dspace/bitstream/2134/2277/1/PUB284.pdf, last accessed Mar. 14, 2007, 40 pages, Loughborough, United Kingdom.

(56) References Cited

OTHER PUBLICATIONS

Assessing Spatial Distribution of Web Resources for Navigation Services http://www.sli.unimelb.edu.au/tomko/publications/tomko04case.pdf.
Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, in Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38—No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In The 14th International Conference on Distributed Computing Systems, Jun. 1994, pp. 29-38.
Mike Spreitzer et al., Scalable, Secure, Mobile Computing with Location Information, Communications of the ACM, Jul. 1993, 1 page, vol. 36—No. 7.
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of The First International Conference on The Practical Application of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Memory, The Proceedings of The First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminating Active Map Information to Mobile Hosts, IEEE Network, 1994, pp. 22-32, vol. 8—No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May 1998, 48 pages.
Mark Weiser, The Computer for the 21st Century, Scientific American, Sep. 1991, 8 pages.
T. Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Serial No. 00/20685, 3 Pages.
Robert M. Losee, Jr., Minimizing information overload: the ranking of electronic messages, Journal of Information Science 15, Elsevier Science Publishers B.V., 1989, pp. 179-189.
[No Author Listed] IBM Technical Disclosure Bulletin, Method of rule-based file, window, and message processing, vol. 38, No. 7, Jul. 1, 1995.
[No Author Listed] Visual Warbling to subtly indicate status conditions, IBM Technical Disclosure Bulleting, vol. 41, No. 1, 1998, pp. 611-613.
Apte et al., Automated Learning of Decision Rules for Text Categorization, ACM Transactions on Information Systems (TOIS), 1994, pp. 233-251, vol. 12, Issue 13.
Boone, Concept Features in Re: Agent, an Intelligent Email Agent, Proceedings of the 2nd International Conference on Autonomous Agents, 1998, pp. 141-148, Minneapolis, MN, USA.
Cohen, Learning the Rules that Classify E-Mail, AAAI Spring Symposium on ML and IR, 1996, accessed at http://www.cs.cmu.edu/~wcohen/postscript/aaai-ss-96.ps, 11 pages.
Crawford et al., An Intelligent Interface for Sorting Electronic Mail, Proceedings of the 7th International Conference on Intelligent User Interfaces, Jan. 13-16, 2002, pp. 182-183, San Francisco, CA, USA.
Forscher, CyberNag (Mailmen Division) Project Notebook, Feb. 21, 1996, accessed at http://www.cc.gatech.edu/computing/classes/cs3302_96_winter/projects/groups/MailMen/, last accessed Feb. 9, 2004, 14 pages.
Heckerman, A Tutorial on Learning with Bayesian Networks, Microsoft Research, Nov. 1996, 57 pages.
Lewis et al., Training Algorithms for Linear Text Classifiers, SIGIR'96, 1996, 9 pages.
Lewis, Evaluating and Optimizing Autonomous Text Classification Systems, International ACM-SIGIR Conference on Research and Development in Information Retrieval, 1995, pp. 246-254.
Marx et al., CLUES: Dynamic Personalized Message Filtering, 1996 ACM.
Mock, An Experimental Framework for Email Categorization and Management Proceedings of the 24th Annual ACM SIGIR Conference, Sep. 19-12, 2001, pp. 392-393, New Orleans, Louisiana, USA.
Smith, Agent Function for viewpoint-like interfaces, Xerox disclosure journal, vol. 19, No. 6, Nov. 1, 1994, p. 481.
Kautz et al., Agents that Reduce Work and Information Overload. Communications of the ACM. 1994;37(7):31-40, 146.
MacSkassy et al., EmailValet: Learning User Preferences for Wireless Email. IJCAI-00 Workshops. Learning About Users and Machine Learning for Information Filtering. 1999:1-6.
MacSkassy et al., EmailValet: Learning Email Preferences from Wireless Platforms. Jun. 3, 1999.
Maes, Agents that Reduce Work and Information Overload. Communications of the ACM. 1994;37(7):31-40, 146.
Maes et al., Learning Interface Agents. AAAI—93 Proceedings. 1993:459-65.
Maes, Social Interface Agents: Acquiring Competence by Learning from Users and other Agents. AAAI Technical Report SS-94-03. 1994:71-78.
Provost et al., Naïve-Bayes vs. Rule-Learning in Classification of Email. University of Texas at Austin. Artificial Intelligence Lab. Technical Report AI-TR-99-284. 1999.
Segal et al., MailCat: An Intelligent Assistant for Organizing Email. Autonomous Agents '99. 1999:276-82.
Kirk, "Artificial Intelligence Applications to Information Warfare", Strategy Research Project, U.S. Army War College, Carlisle Barracks, PA, 17013-5050, Mar. 22, 1996, 35 pages.
Lewis, "Evaluating and Optimizing Autonomous Text Classification Systems", International ACM-SIGIR Conference on Research and Development in Information Retrieval, Jul. 1995, pp. 246-254.
Mostafa et al., "A Multilevel Approach to Intelligent Information Filtering: Model, System, and Evaluation", ACM Transactions on Information Systems, vol. 15, No. 4, Oct. 1997, pp. 368-399.

* cited by examiner

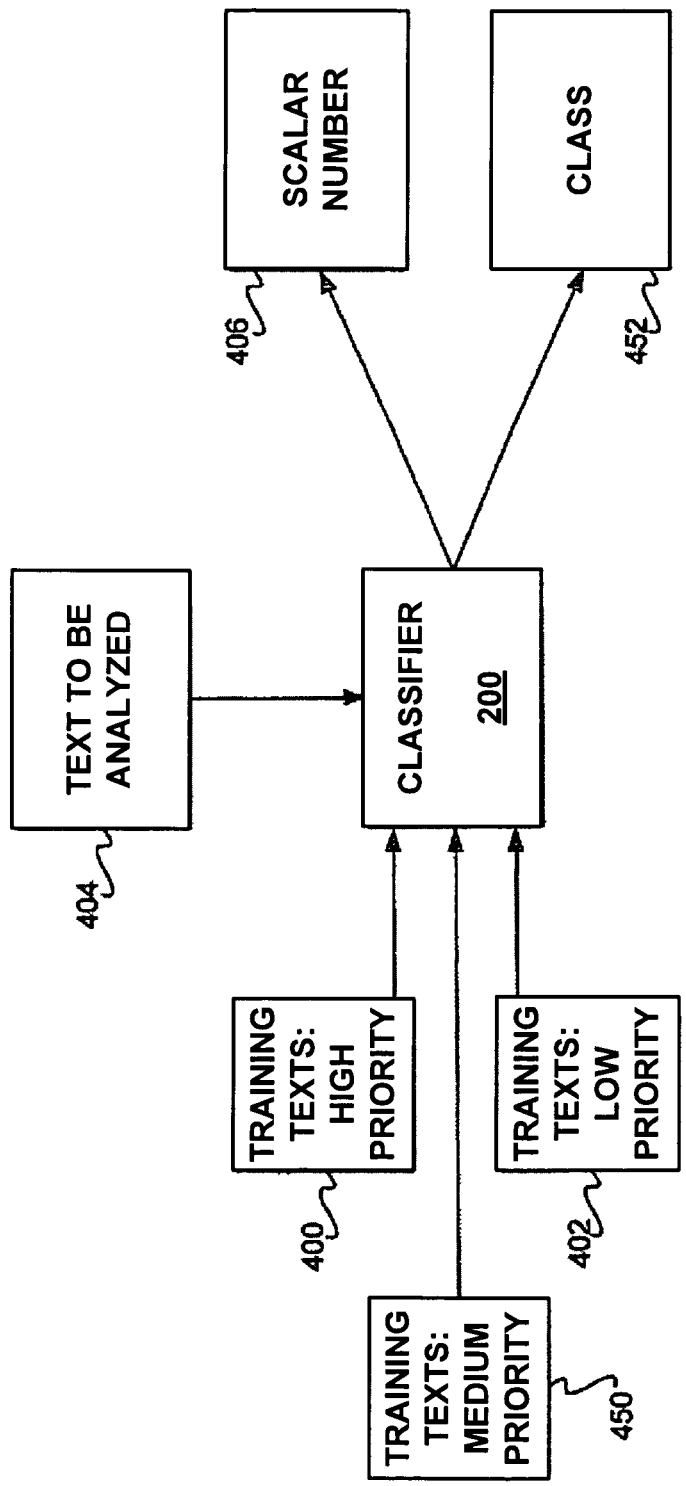

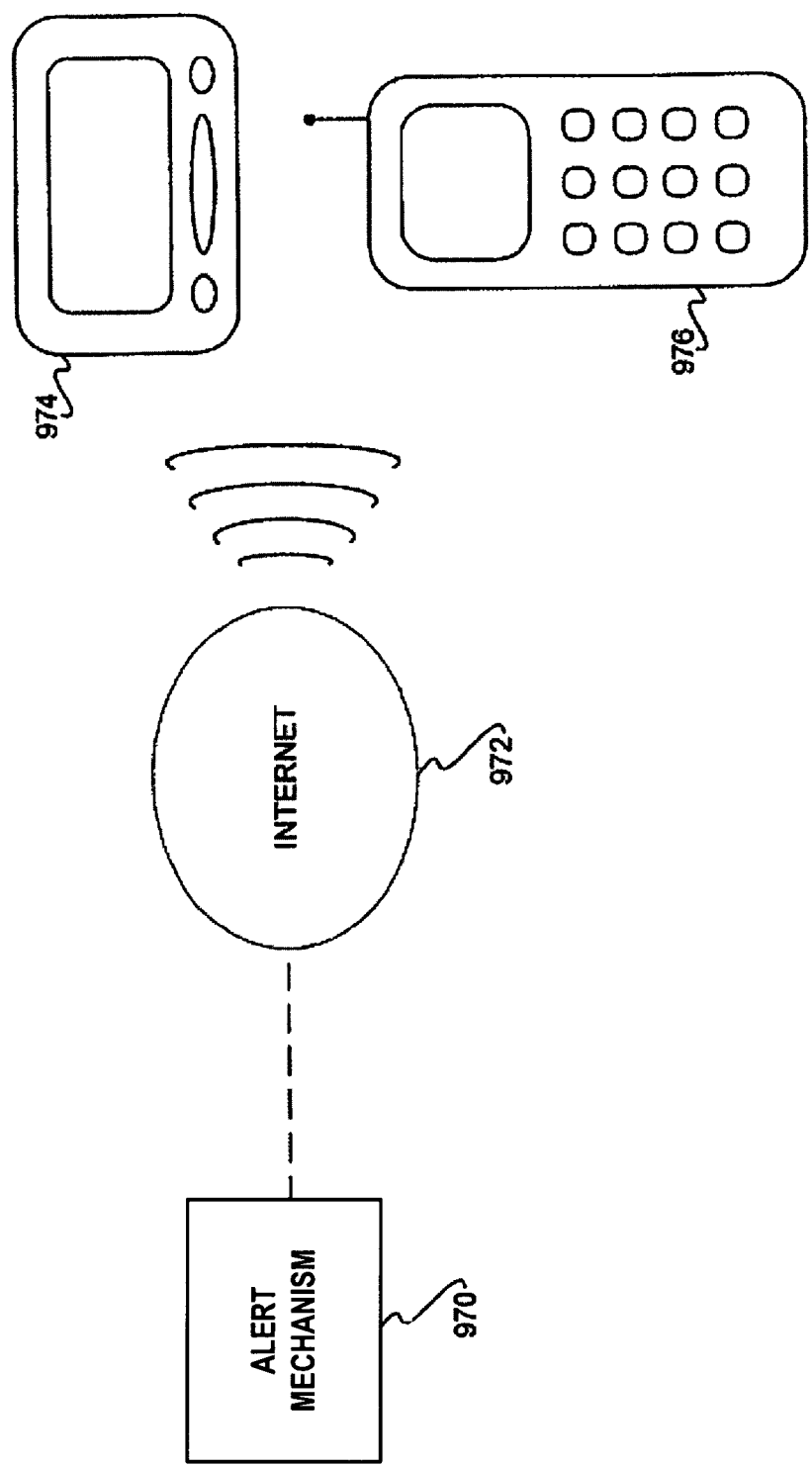

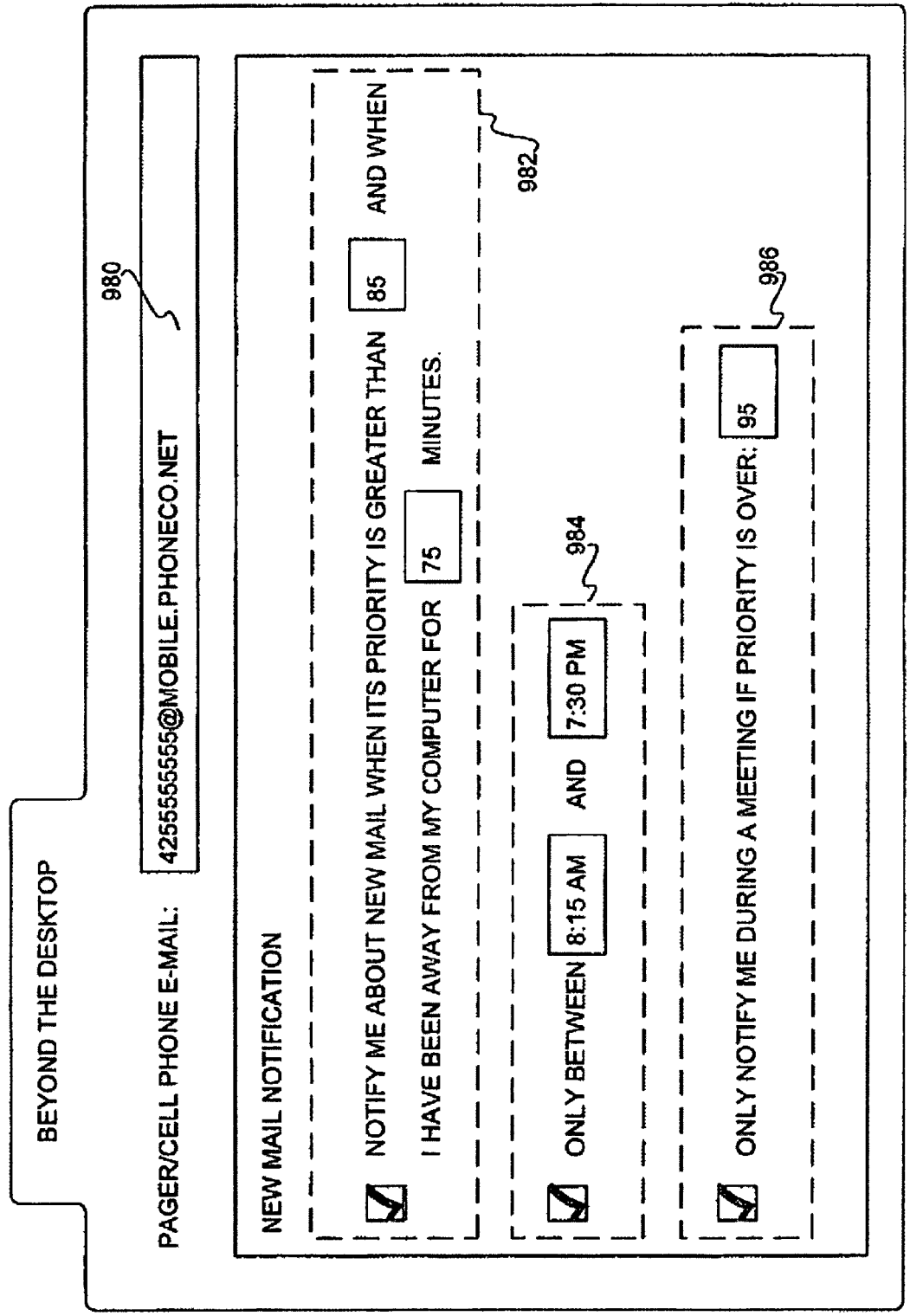

INTEGRATION OF A COMPUTER-BASED MESSAGE PRIORITY SYSTEM WITH MOBILE ELECTRONIC DEVICES

RELATED APPLICATIONS

This application is a continuation of U.S. Ser. No. 10/795,695, Filed Mar. 8, 2004 now U.S. Pat. No. 7,444,384, entitled "Integration of a Computer-Based Message Priority System With Mobile Electronic Devices", which is a continuation of Ser. No. 09/365,293, filed on Jul. 30, 1999 now U.S. Pat. No. 6,714,967, entitled "Integration of a Computer-Based Message Priority System With Mobile Electronic Devices", which is related to the cofiled, copending and coassigned applications entitled "Method for Automatically Assigning Priorities to Documents and Messages", filed on Jul. 30, 1999 and assigned Ser. No. 09/364,527, "Methods for Routing Documents based on a Measure of Criticality", filed on Jul. 30, 1999 and assigned Ser. No. 09/364,528, "Methods for Display, Notification, and Interaction with Prioritized Messages", filed on Jul. 30, 1999, and assigned Ser. No. 09/364,522, and "A Computational Architecture for Managing the Transmittal and Rendering of Information, Alerts, and Notifications", filed on Jul. 30, 1999 and assigned Ser. No. 09/365,287. The entirety of which are incorporated herein by reference.

FIELD OF THE INVENTION

This invention relates generally to prioritized text such as prioritized email messages, and more particularly to electronic device alerting for such prioritized text.

BACKGROUND OF THE INVENTION

Electronic mail programs have become a popular application among computer users. Especially with the advent of the Internet, exchanging email has almost become a reason why people purchase computers for personal reasons, and within many corporate environments, email has become the standard manner by which coworkers exchange information. However, with the increasing popularity of email, shortcomings have become apparent.

Chief among these shortcomings is that many users now face a deluge of email every day, such that the capability of being able to send and receive email has almost become a hindrance to their day-to-day ability to get their job done, as opposed to being an asset. Some users report receiving over 100 email messages a day. With such large numbers of email, it is difficult to manage the email, such that the users read the most important messages first.

Limited solutions to this problem have been attempted in the prior art. Prior art exists for attempting to curtail the amount of junk email—e.g., unsolicited email, typically regarding a service or product for sale—that users receive. Moreover, some electronic mail programs allow for the generation of rules that govern how an email is managed within the program—for example, placing all emails from certain coworkers in a special folder.

These limited solutions, however, do not strike at the basic problem behind email—that with so much email being received, it would be most useful for a user to be able to have his or her computer automatically prioritize the email by importance or review urgency, and perform actions based on that prioritization. For these and other reasons, there is a need for the present invention.

SUMMARY OF THE INVENTION

The invention relates to electronic device alerting for prioritized text. In one embodiment, a computer-implemented method first receives a text. The method generates a priority of the text, based on a text classifier such as a Bayesian classifier or a support-vector machine classifier. The method then alerts a user on an electronic device, such as a pager or a cellular phone, based on an alert criteria.

Embodiments of the invention provide for advantages over the prior art. A user, for example, in one embodiment, may ask that he or she only be disturbed if the priority of the text is greater than a given threshold. Thus, even if the user receives over 100 different email, he or she will be alerted to the most important email, and then will be able to deal with the other email when the user has time. Prioritization, in other words, makes email much more useful in environments where a lot of email is exchanged on a regular basis.

Embodiments of the invention include computer-implemented methods, computer-readable media, and computerized systems of varying embodiments. Still other embodiments, advantages and aspects of the invention will become apparent by reading the following detailed description, and by reference to the drawings.

BRIEF DESCRIPTION OF THE DRAWINGS

FIG. 4(b) is a diagram of another scheme according to which the priority of a text can be classified, according to another embodiment of the invention;

FIG. 13 is a diagram of a system according to another embodiment of the invention; and, FIG. 14 is a diagram of a user interface via which alert criteria can be modified, according to an embodiment of the invention.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. (It is noted that the terms document and text are used interchangeably herein and should be construed as interchangeable as well.)

Operating Environment

Figure 1:
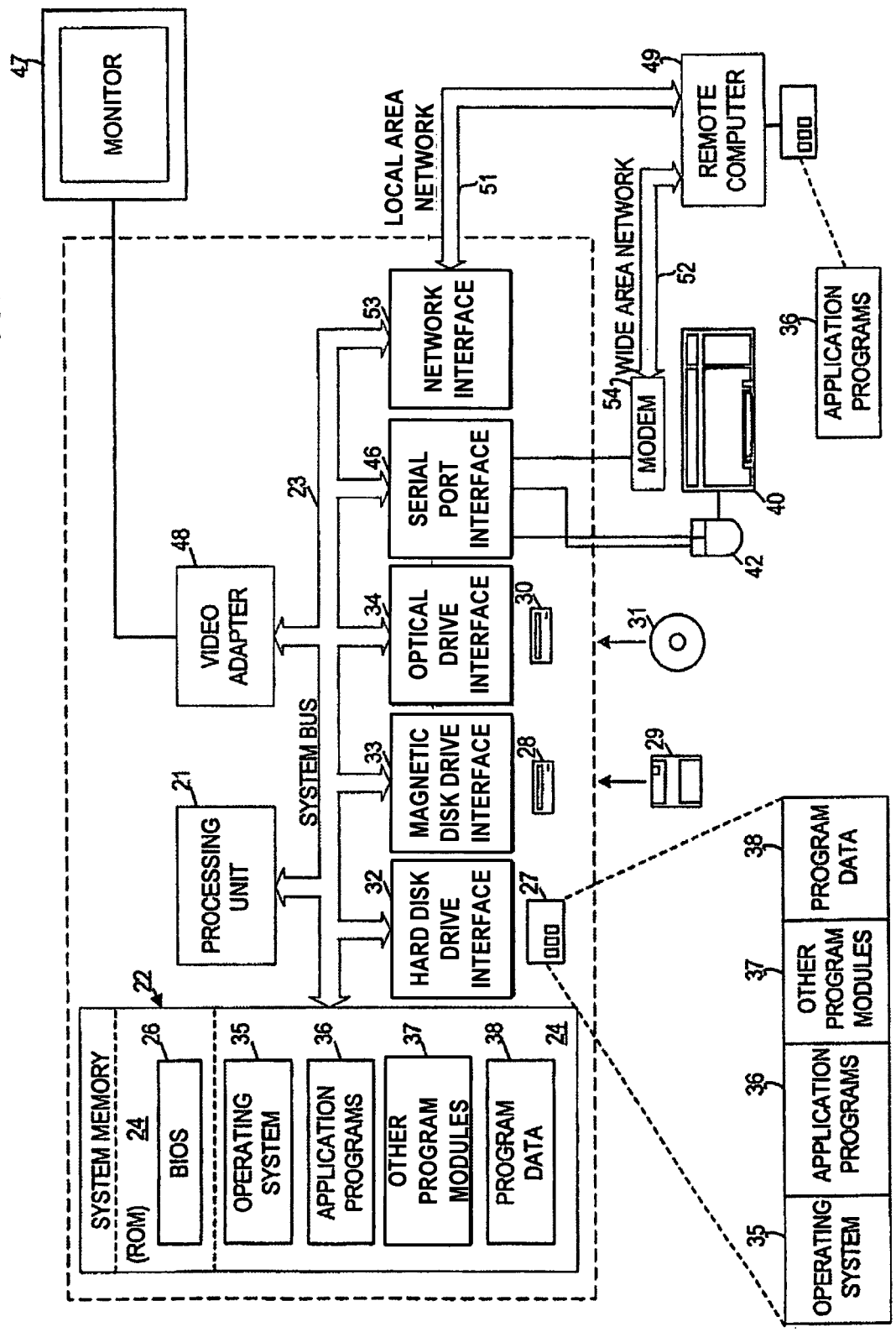
FIG. 1 is a diagram of an operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Generating a Priority for a Text

In this section of the detailed description, the generation of a priority for a text such as an email, according to one embodiment of the invention, is described. The generation of priorities for texts as described can then be used in methods, systems, and computer-readable media (as well as other embodiments) of the invention as are presented in other sections of the detailed description. The description in this section is provided in conjunction with FIG. 2 and FIG. 3, the former which is a diagram showing explicit and implicit training of a text classifier, according to an embodiment of the invention, and the latter which is a diagram showing how a priority for a text is generated by input to a text classifier, according to an embodiment of the invention. The description is also provided in conjunction with FIGS. 4(a) and 4(b), which are diagrams of different schema according to which the priority of a text can be classified, and in conjunction with FIGS. 5(a) and 5(b), which are graphs showing different cost functions that may be applicable depending on text type.

Figure 2:
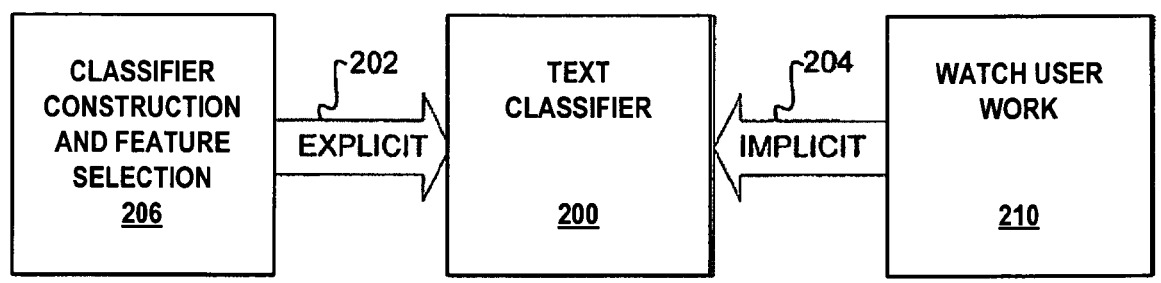
FIG. 2 is a diagram showing explicit and implicit training of a text classifier, according to an embodiment of the invention.

Referring first to FIG. 2, the text classifier 200 is able to be trained both explicitly, as represented by the arrow 202, and implicitly, as represent by the arrow 204. The explicit training represented by the arrow 202 is usually conducted at the initial phases of constructing the text classifier 200, while the implicit training represented by the arrow 204 is usually conducted after the text classifier 200 has been constructed, to fine tune the classifier 200. However, the invention is not so limited.

The text classifier 200 in one embodiment is a Bayesian classifier, as known within the art, while in another embodiment it is a support vector machine (SVM) classifier, as also known within the art. Text classification methodology based on a Bayesian learning approach is specifically described in the reference M. Sahami, S. Dumais, D. Heckerman, E. Horvitz, A Bayesian Approach to Junk E-Mail Filtering, AAAI Workshop on Text Classification, July 1998, Madison, Wis., AAAI Technical Report WS-98-05, which is hereby incorporated by reference. Text classification methodology based on an SVM approach is specifically described in the following references: the coassigned patent, U.S. Pat. No. 5,864,848, issued Jan. 26, 1999, which is hereby incorporated by reference; the previously filed and coassigned case entitled "Methods and Apparatus for Building a Support Vector Machine Classifier," Ser. No. 09/055,477, filed on Apr. 6, 1998, which is also hereby incorporated by reference; and, the reference J. Platt, Fast Training of Support Vector Machines using Sequential Minimal Optimization, MIT Press, Baltimore, Md., 1998, which is also hereby incorporated by reference. For purposes of this application, specific description is made with reference to an SVM classifier, although those of ordinary skill within the art can appreciate that the invention is not so limited.

As shown in FIG. 2, the explicit training of the text classifier 200 as represented by the arrow 202 includes constructing the classifier in 206, including utilizing feature selection. In general, Support Vector Machines build classifiers by identifying a hyperplane that separates a set of positive and negative examples with a maximum margin. In the linear form of SVM that is employed in one embodiment, the margin is defined by the distance of the hyperplane to the nearest positive and negative cases for each class. Maximizing the margin can be expressed as an optimization problem. A post-processing procedure described in the Platt reference is used that employs regularized maximum likelihood fitting to produce estimations of posterior probabilities. The method fits a sigmoid to the score that is output by the SVM classifier.

In the explicit training, the text classifier is presented with both time-critical and non-time-critical texts (e.g., email messages), so that it may be able to discriminate between the two. This training set may be provided by the user, or a standard training set may be used. Given a training corpus, the text classifier first applies feature-selection procedures that attempt to find the most discriminatory features. This process employs a mutual-information analysis. Feature selection can operate on single words or higher-level distinctions made available, such as phrases and parts of speech tagged with natural language processing—that is, the text classifier 200 is able to be seeded with specially tagged text to discriminate features of a text that are considered important.

Feature selection for text classification typically performs a search over single words. Beyond the reliance on single words, domain-specific phrases and high-level patterns of features are also made available. Special tokens can also enhance classification. The quality of the learned classifiers for email criticality can be enhanced by inputting to the feature selection procedures handcrafted features that are identified as being useful for distinguishing among email of different time criticality. Thus, during feature selection, single words as well as special phrases and symbols that are useful for discriminating among messages of different levels of time criticality are considered.

Tokens and patterns of value in identifying the criticality of messages include such distinctions as (including Boolean combinations thereof):

To: field

Addressed just to user
Addressed to only a few people including user
Addressed to an alias with a small number of people
Addressed to several aliases with a small number of people
Cc:'d to user
Bcc:'d to user
People Names on pre-determined list of important people
Family members
People at company

| |
|---|
| Organization chart structure |
|     Managers I report to |
|     Managers of managers of people I report to |
|     People who report to me |
| External business people |
| Past tense |

| |
|---|
| These include descriptions about events that have already occurred such as: |
| We met |
| meeting went |
| happened |
| got together |
| took care of |
| meeting yesterday |
| Future tense |

| |
|---|
| Tomorrow |
| This week |
| Are you going to |
| When can we |
| Meeting and coordination |

| |
|---|
| Get together |
| Can you meet |
| Will get together |
| Coordinate with |
| Need to get together |
| Resolved dates |

| |
|---|
| Dates indicated from text and msg. time |
| (e.g., tomorrow, send yesterday) |
| Questions |

| |
|---|
| Word + ? |
| Indications of personal requests: |
| |
| Can you |
| Are you |
| Will you |
| you please |
| Can you do |
| Indications of need: |

| |
|---|
| I need |
| He needs |
| She needs |
| I'd like |
| It would be great |
| I want |
| He wants |
| She wants |
| Take care of |
| Time criticality |

| |
|---|
| happening soon |
| right away |
| deadline will be |
| deadline is |
| as soon as possible |
| needs this soon |
| to be done soon |
| done right away |
| Importance |

| |
|---|
| is important |
| is critical |
| Word + ! |
| Explicit priority flag status (low, none, high) |
| Length of message |

| |
|---|
| Number of bytes in component of new message |
| Signs of Commercial and Adult-Content Junk email |

| |
|---|
| Free!! |
| !!! |
| Under 18 |
| Adult |
| Percent caps |

| |
|---|
| Percent nonalphanumeric characters |
| etc. |

Other features that may be used for feature selection are described in the cofiled, copending and coassigned application entitled "A Computational Architecture for Managing the Transmittal and Rendering of Information, Alerts, and Notifications", which is hereby incorporated by reference, and in the copending and coassigned application entitled "Methods and Apparatus for Building a Support Vector Machine Classifier," Ser. No. 09/055,477, filed on Apr. 6, 1998, which has already been incorporated by reference.

Furthermore, still referring to FIG. 2, implicit training of the text classifier 200, as represented by the arrow 204, can be conducted by continually watching the user work in 210. The assumption is that as users work, and lists of mail are reviewed, time-critical messages are read first, and low-priority messages are reviewed later, or just deleted. That is, when presented with a new email, the user is watched to determine whether or she immediately opens the email, and in what order (if more than one new email are present), deletes the email without opening, and/or replies to the email right away. Thus, the text classifier is such that a user is continually watched while working, and the classifier is continually refined by training in the background and being updated in real time for decision making. For each message inputted into the classifier, a new case for the classifier is created. The cases are stored as negative and positive examples of texts that are either high or low priority.

Figure 3:
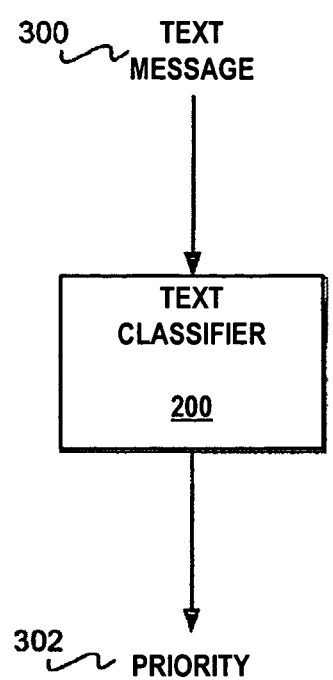
FIG. 3 is a diagram showing how a priority for a text is generated by input to a text classifier, according to an embodiment of the invention.
Figure 4A:
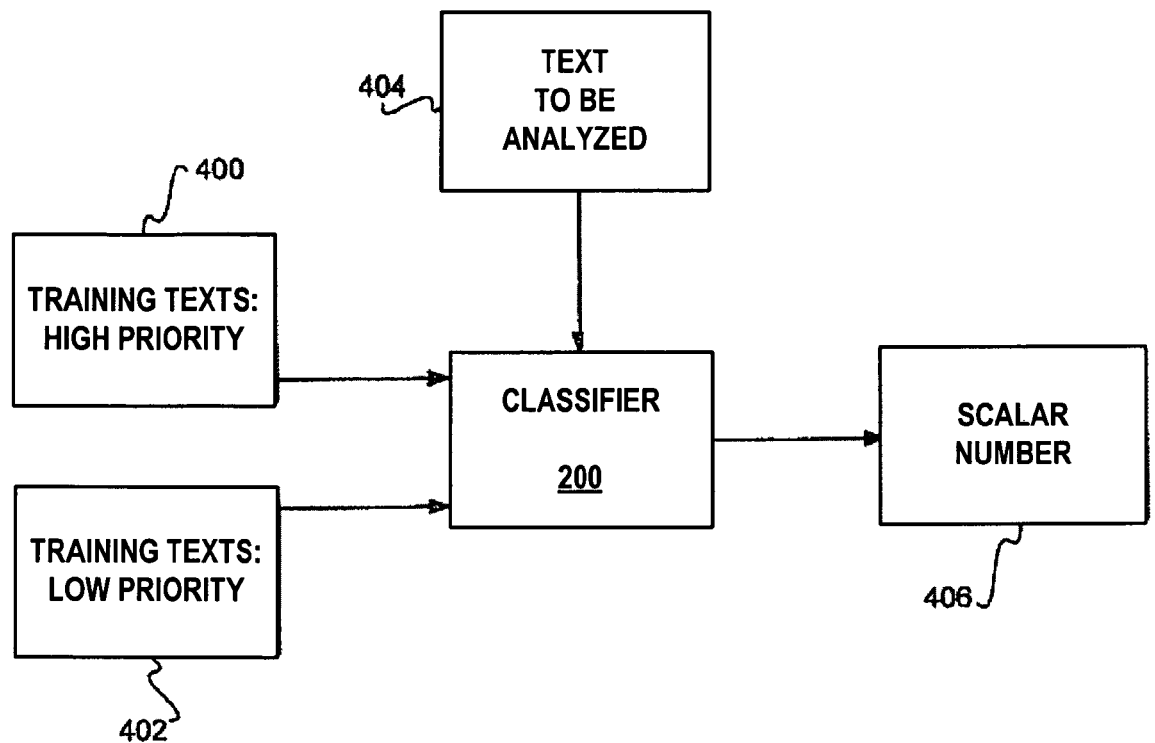
FIG. 4(a) is a diagram of a scheme according to which the priority of a text can be classified, according to an embodiment of the invention.

Referring next to FIG. 3, a text, such as an email message, 300 is input into the text classifier 200, which based thereon generates a priority 302 for the text 300. That is, in one embodiment, the text classifier 200 generates a priority 302, measured as a percentage from 0 to 1 (i.e., 0% to 100%). This percentage is a measure of the likelihood that the text 300 is of high priority, based on the previous training of the classifier 200.

It is noted that as has been described, the text classifier and the priority generated thereby is based on a scheme where each email in the training phase is construed as either high priority or low priority, such that the priority generated by the text classifier is a measure of the likelihood of the text being analyzed is of high priority. This scheme is specifically shown by reference to FIG. 4(*a*), where the text classifier 200 is trained by a group of texts 400 that are high priority and a group of texts 402 that are low priority, such that a text to be analyzed 400 is input into the classifier 200, which outputs a scalar number 406 measuring the likelihood that the text being analyzed is of high priority. However, those of ordinary skill within the art can appreciate that the invention is not so limited.

For example, referring to FIG. 4(*b*), a diagram showing a scheme where texts are divided into low, medium and high priority, according to an embodiment of the invention, is shown. The text classifier 200 in the embodiment of FIG. 4(*b*) is trained by a group of texts 400 that are high priority and a group of texts 402 that are low priority, as in the previous embodiment, but also by a group of texts 450 that are medium priority. Thus, a text to be analyzed 400 is input into the classifier 200, which outputs a scalar number 406, that can measure the likelihood that the text being analyzed is of high priority, if so desired, or medium priority or low priority. The classifier 200 is also able to output a class 452, which indicates the class of low, medium or high priority that the text 404 most likely falls into. Those of ordinary skill within the art can appreciate that further classes can also be added if desired.

The invention is not limited to the definition of priority as this term is used by the text classifier to assign such priority to a text such as an email message. In one embodiment, however, priority is defined in terms of a loss function. More specifically, priority is defined in terms of the expected cost in lost opportunities per time delayed in reviewing the text after it has be received—that is, the expected lost or cost that will result for delayed processing of the text. This loss function can further vary according to the type of text received.

Figure 5A:
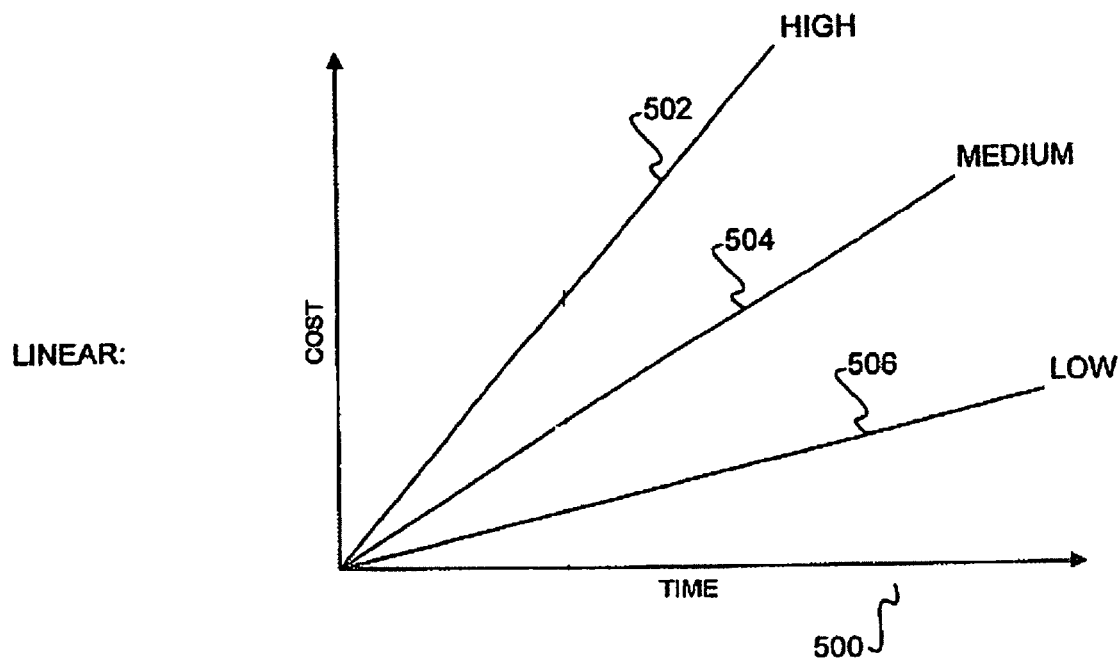
FIG. 5(a) is a graph showing linear cost functions of high, medium and low priority texts, according to an embodiment of the invention.

For example, the general case is shown in FIG. 5(a), which is a graph of linear cost functions dependent on the priority of a text. In the graph 500, as time increases, the cost of not having reviewed a text also increases. However, the cost increases more for a high priority message, as indicated by the line 502, as compared to a medium priority message, as indicated by the line 504, or a low priority message, as indicated by the line 506. That is, the high priority line 502 may have a slope of 100, the medium priority line 504 may have a slope of 10, and the low priority line 502 may have a slope of 1. These slope values can then be used by the text classifier to assist in assigning a priority to a given text, for example, by regression analysis.

Figure 5B:
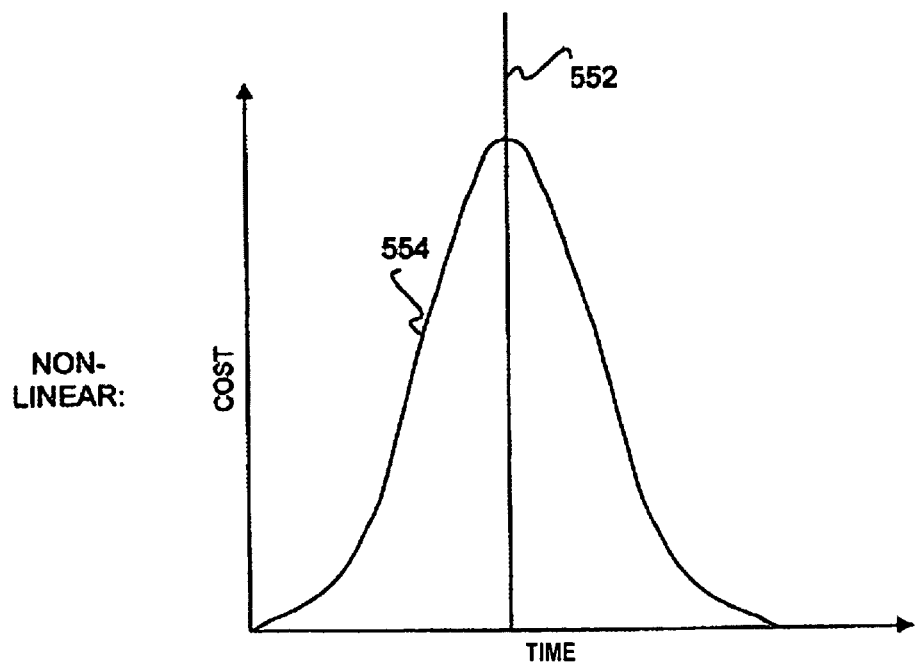
FIG. 5(b) is a graph showing a non-linear cost function for a text, according to an embodiment of the invention.

Some messages, however, do not have their priorities well approximated by the use of a linear cost function. For example, a message relating to a meeting will have its cost function increase as the time of the meeting nears, and thereafter, the cost function rapidly decreases—since after the meeting is missed, there is not much generally a user can do about it. This situation is better approximated by a non-linear cost function, as shown in FIG. 5(b). In the graph 550, the cost function 554 rapidly increases until it reaches the time of the meeting demarcated by the line 552, after which it rapidly decreases. Thus, those of ordinary skill within the art can appreciate that depending on a message's type, the cost function can be approximated by one of many different representative cost functions, both linear and non-linear.

Thus, as has been described, the priority of a text can be just the likelihood that it is of high priority based on output of a text classifier, or the most likely priority class (i.e., medium, low or high priority) it falls into, also based on the output of the text classifier. However, in another embodiment of the invention, an expected time criticality of each text, such as an email message, is determined. This can be written as $$EL = \sum_{i}^{n} p(critical_i)C(critical_i)$$

where EL is the expected loss, $p(critical_i)$ is the probability that a text has the criticality i (e.g., where i=0 may be low priority and i=1 may be high priority, or where i=0 may be low priority, i=1 medium priority and i=2 high priority, etc.), $C(critical_i)$ is the cost function for text having the criticality i, and n is the total number of criticality classes minus one. The cost functions may be linear or non-linear, as has been described—in the case where the function are linear, the cost function is thus the rate of loss.

In the case where n=1, specifying that there are only two priority classes low and high, the expected loss can be reformulated as $$EC = p(critical_{high})C(critical_{high}) + [1 - p(critical_{low})]C(critical_{low})$$

where EC is the expected criticality of a text. Furthermore, if the cost function of low criticality messages is set to zero, this becomes $$EC = p(critical_{high})C(critical_{high})$$

The total loss until the time of review of a text can be expressed as the integration of the expressed criticality, or, $$EL = \int_0^t p(critical_{high})C(critical_{high})$$

where t is the time of review.

Determining when to Alert the User

In this section of the detailed description, described is provided as to determining when to alert the user of a high-priority text, for example, a text that has a likelihood of being high priority greater than a user-set threshold, or greater than a threshold determined by decision theoretic reasoning. That is, beyond knowing about time critical messages, it is also important in one embodiment to decide when to alert a user to time-critical messages if the user is not directly viewing incoming email (in one embodiment). In the general case, a cost of distracting the user from the current task being addressed to learn about the time-critical message is determined.

In general, a user should be alerted when a cost-benefit analysis suggests that the expected loss the user would incur in not reviewing the message at time t is greater than the expected cost of alerting the user. That is, alerting should be conducted if $$EL - EC > 0$$

where EL is the expected loss of non-review of the text at a current time t, and EC is the expected cost of alerting the user of the text at the current time t. The expected loss is as described in the previous section of the detailed description.

However, this formulation is not entirely accurate, because the user is assumed to review the message on his or her own at some point in the future anyway. Therefore, in actuality, the user should be alerted when the expected value of alerting, referred to as ECA, is positive. The expected value of alerting should thus consider the value of alerting the user of the text now, as opposed to the value of the user reviewing the message later on his or her own, without alert, minus the cost of alerting. This can be stated as $$EVA = EL_{alert} - EL_{no-alert} - EC$$

where $EL_{alert}$ is the expected loss of the user reviewing the message if he or she were to review the message now, upon being alerted, as opposed to $EL_{no-alert}$, which is the expected loss of the user reviewing the message on his or her own at some point, without being alerted, minus EC, the expected cost of alerting (now).

Furthermore, in one specific embodiment of the invention, information from several messages are grouped together into a single compound alert. Reviewing information about multiple messages in an alert can be more costly than an alert relaying information about a single messages. Such increases in distraction can be represented by making the cost of an alert a function of its informational complexity. It is assumed that the EVA of an email message is independent of the EVA of the other email messages. $EVA(M_i, t)$ is used to refer to the value of alerting a user about a single message $M_i$ at time t and ECA(n) is used to refer to the expected cost of relaying the content of n messages. Thus, multiple messages can be considered by summing together the expected value of relaying information about a set of n messages, $$NEVA = \sum_{i=1} EVA(M_i, t) - ECA(n).$$

In one embodiment of the invention, it is noted that determining when to alert the user is conducted in accordance with the more rigorous treatment of EVA described in the copending, cofiled and coassigned application entitled "A Computational Architecture for Managing the Transmittal and Rendering of Information, Alerts, and Notifications" Ser. No. 09/365,287, which is hereby incorporated by reference. However, the invention is not so limited.

It is also noted that in order to determine the expect cost of alerting, it is useful to infer or directly access information about whether the user is present—and therefore can see or hear alerts from the computer—or is not present. Sensors can be used in one embodiment that indicate when a user is in the office, such as infrared sensors, pressure sensors (on the chair), etc. However, if such devices are not available, a probability that a user is in the office can be assigned as a function of user activity on the computer, such as the time since last observed mouse or keyboard activity. Furthermore, scheduling information available in a calendar can also be made use of to make inferences about the distance and disposition of a user, to consider the costs of forwarding messages to the user by different means (e.g., cell phone, pager, etc.).

Figure 6:
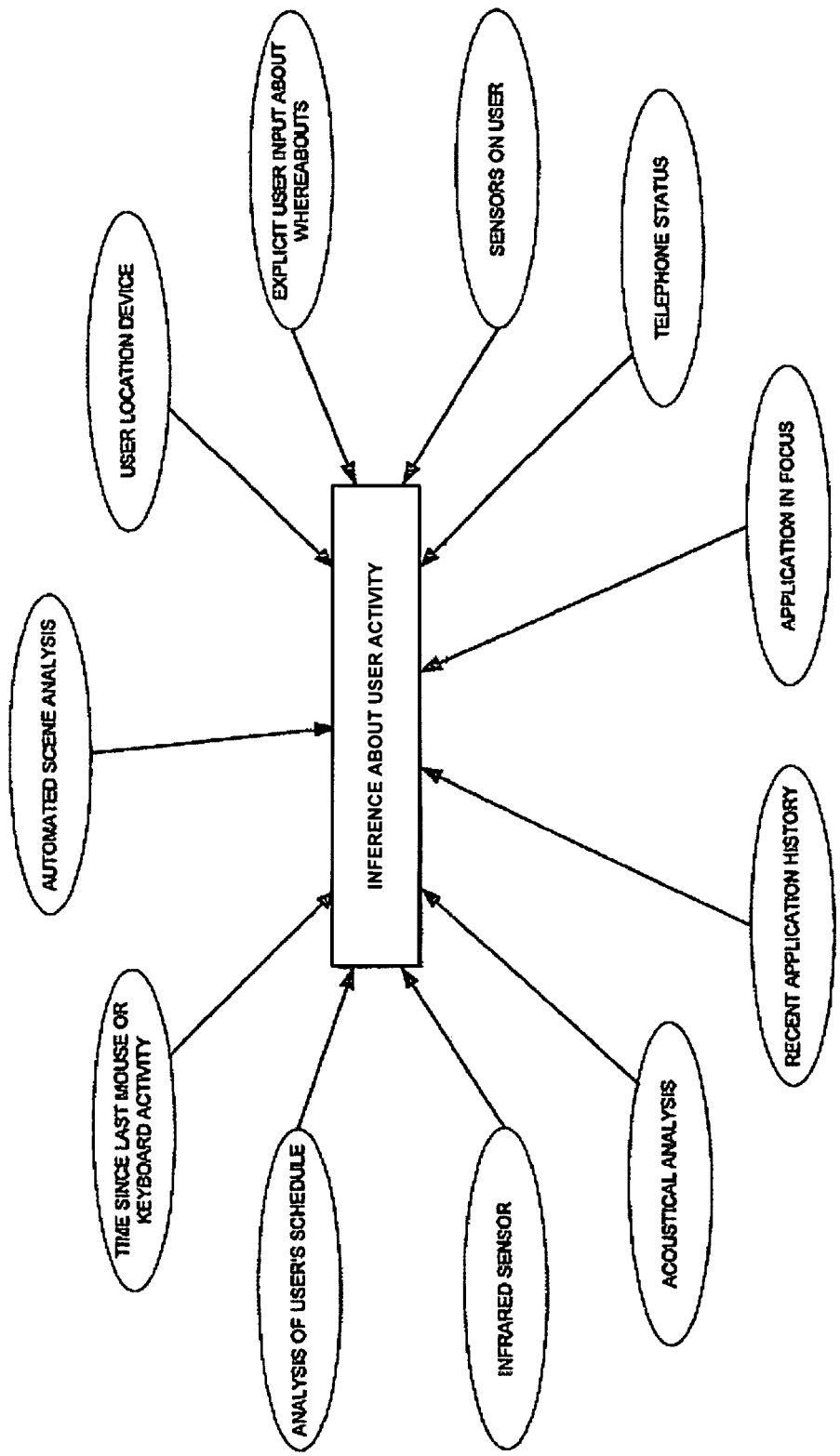
FIG. 6 is a diagram showing classes of evidence that can be used to make an inference about a user's activity (e.g., if a user is present), according to one embodiment of the invention.
Figure 7:
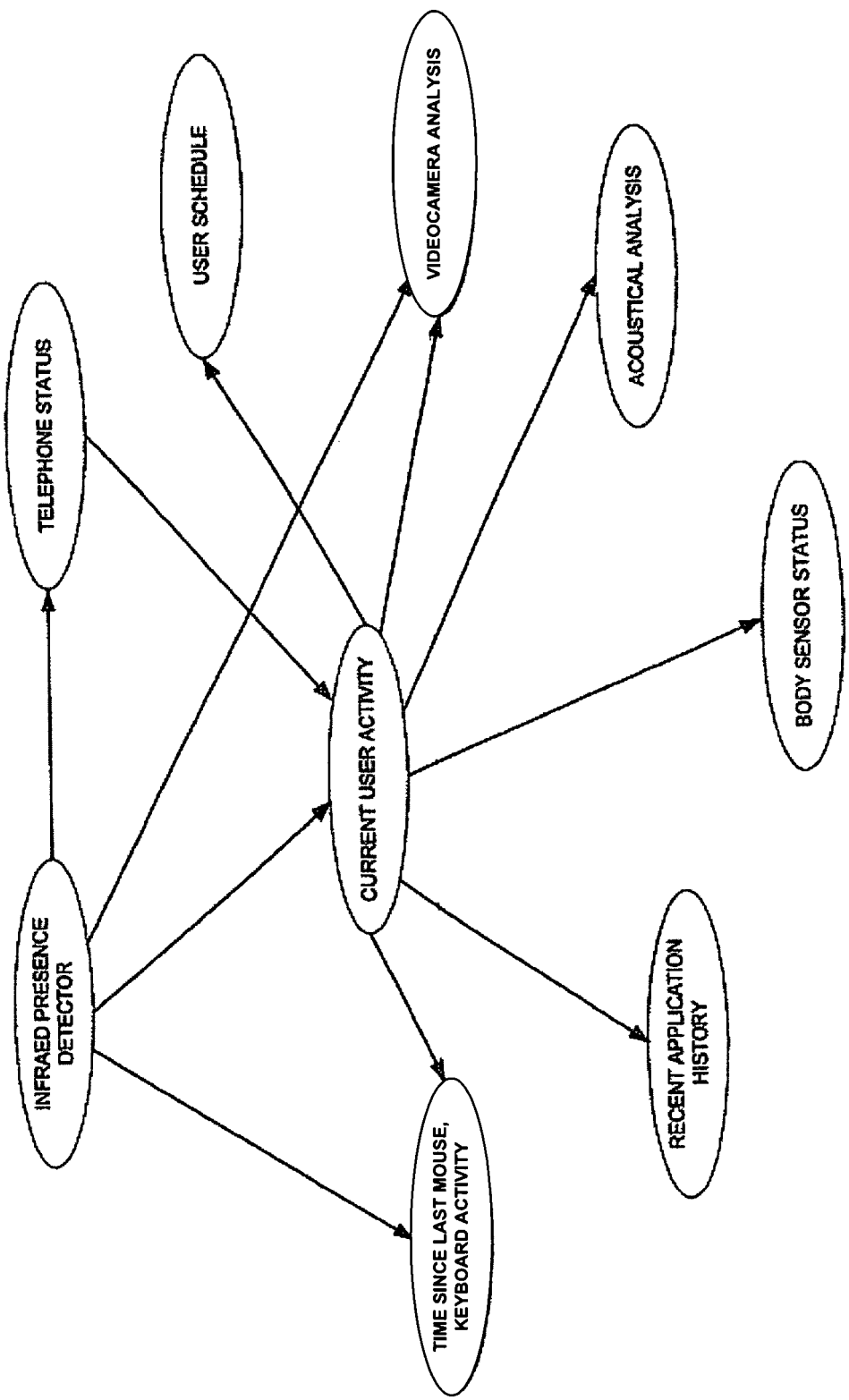
FIG. 7 is a diagram showing a Bayesian network that can be used for inferring a user's activity (e.g., if a user is present), according to one embodiment of the invention.

It is also important to know how busy the user is in making decisions about interrupting the user with information about messages with high time criticality. In one embodiment, it is reasoned about whether and the rate at which a user is working on a computer, or whether the user is on the telephone, speaking with someone, or at a meeting at another location. In one embodiment, several classes of evidence can be used to assess a user's activity or his or her focus of attention, as shown in FIG. 6. A Bayesian network, as known in the art, can then be used for performing an inference about a user's activity; an example of such a network is shown in FIG. 7. Utilizing evidence to infer whether the user is present is described more rigorously in the cofiled, copending and coassigned application entitled "A Computational Architecture for Managing the Transmittal and Rendering of Information, Alerts, and Notifications" Ser. No. 09/365,287, which has already been incorporated by reference (specifically, with respect to determining an alert-reception probability). Thus, in one embodiment, a probability inference as to whether a user is present is determined in accordance with the description provided in this application.

In general, a decision should be made as to when and how to alert users to messages and to provide services (for example) based on the inference of expected criticality and user activity. In one embodiment, this decision is made as described in the cofiled, copending and coassigned application entitled "A Computational Architecture for Managing the Transmittal and Rendering of Information, Alerts, and Notifications" Ser. No. 09/365,287, which has already been incorporated by reference (specifically, with respect to the attention management module).

Figure 8:
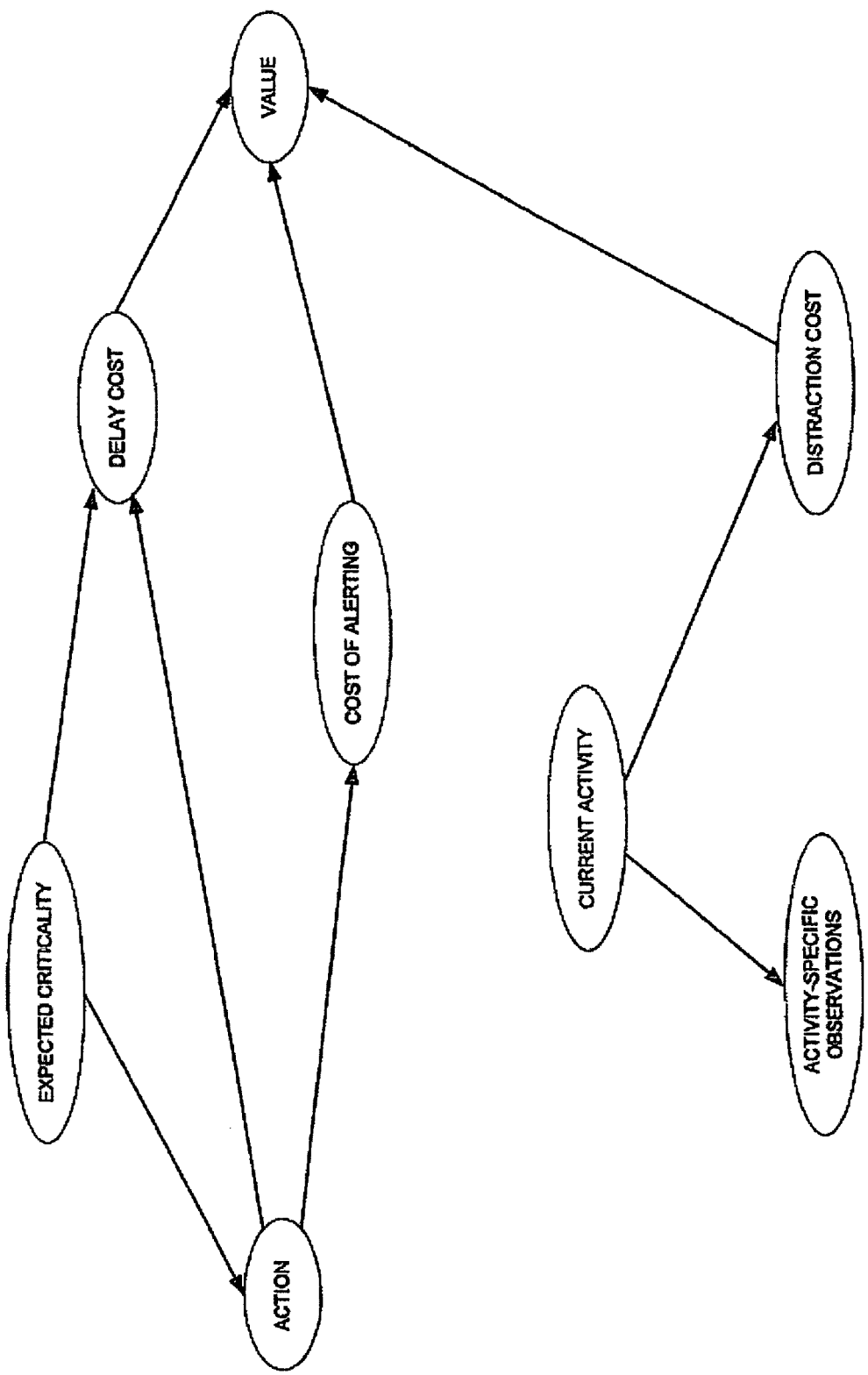
FIGS. 8-10 are influence diagrams showing how in one embodiment decision models can be utilized to make the decision as to how and when to alert a user to a message.
Figure 9:
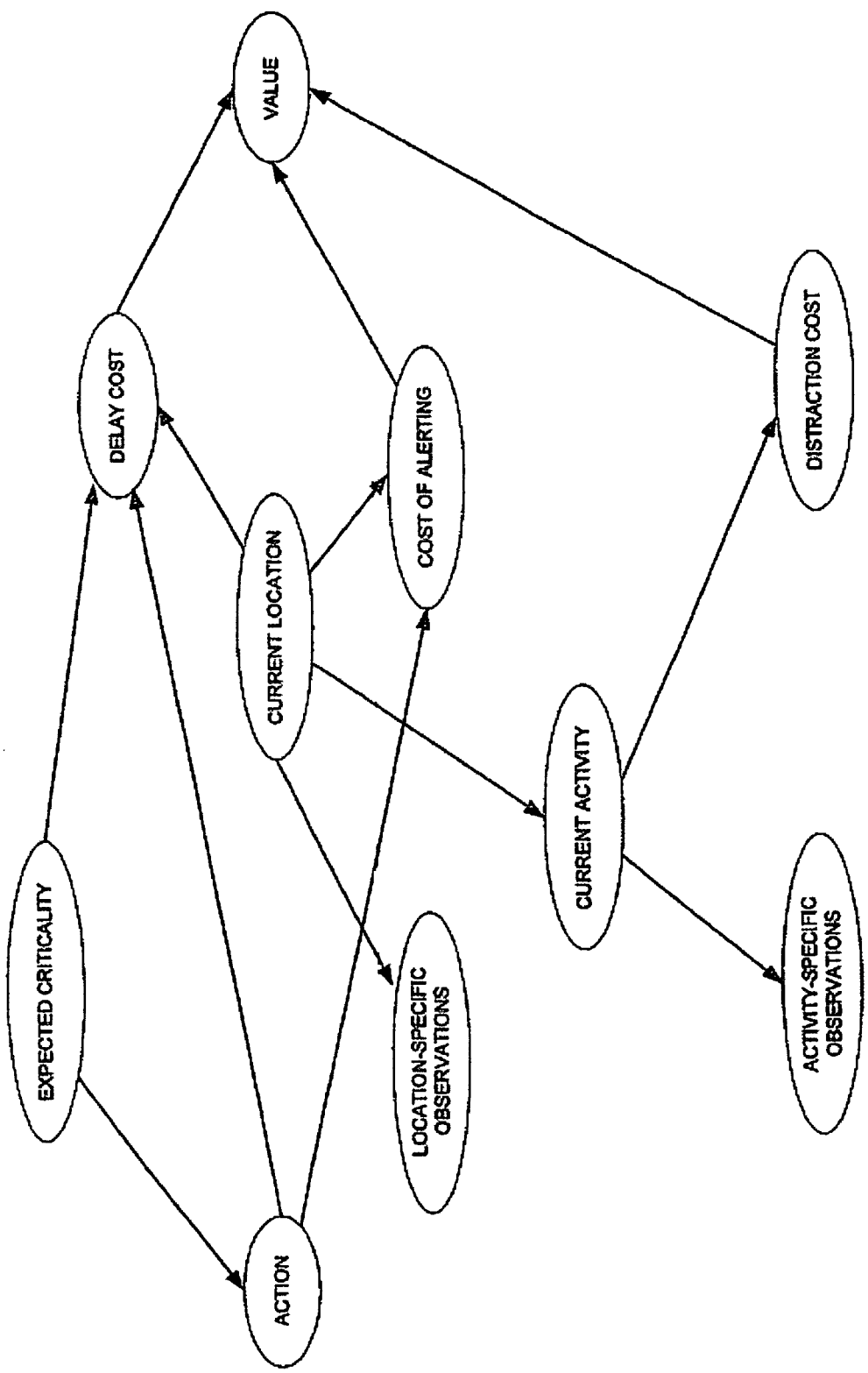
Figure 10:
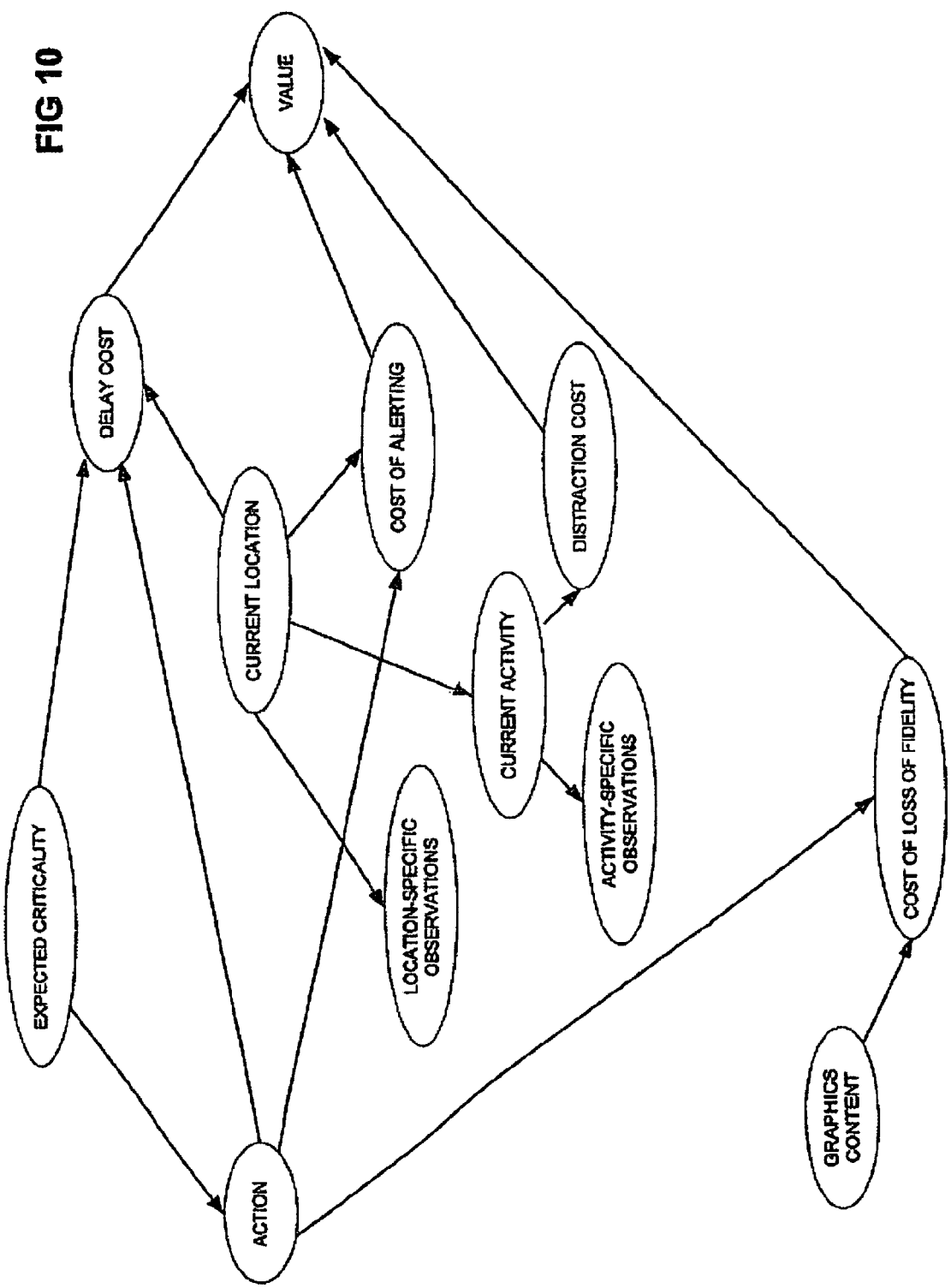

In another embodiment, this decision is made by utilizing decision models, as known within the art. FIGS. 8-10 are influence diagrams, as known within the art, showing how in one specific embodiment such decision models can be utilized to make this decision. Specifically, FIG. 8 displays a decision model for decisions about interrupting a user, considering current activity, expected time criticality of messages, and cost of alerting depending on the modality. FIG. 9 also includes variables representing the current location and the influence of that variable on activity and cost of the alternate messaging techniques. Finally, FIG. 10 is further expanded to consider the costs associated with losses in fidelity when a message with significant graphics content is forwarded to a user without the graphical content being present.

In still another embodiment, the decision as to when and how to alerts users is made by employment of a set of user-specified thresholds and parameters defining policies on alerting. In this embodiment, user presence can be inferred based on mouse or keyboard activity. Thus, a user can be allowed to input distinct thresholds on alerting for inferred states of activity and nonactivity. Users can input an amount of idle activity following activity where alerting will occur at lower criticalities. In this embodiment, if it is determined that the user is not available based on the time that no computer activity is seen—or on the user's inactivity when an attempt to alert is made—then messages and stored, and are reported to the user in order of criticality when the user returns to interact with the computer (or, returns to the room, given the availability of inputs from infrared or other presence detection).

Furthermore, in this embodiment, users can specify routing and paging options (as well as other output options) as a function of quantities including expected criticality, maximum expected loss, and value of alerting the user. Such routing, paging and other output options are more specifically described in the copending, cofiled, and coassigned applications entitled "Methods for Routing Documents based on a Measure of Criticality" Ser. No. 09/364,528, "Methods for Display, Notification, and Interaction with Prioritized Messages" Ser. No. 09/364,522, which are all hereby incorporated by reference. The invention is not so limited, however.

Method and System

In this section of the detailed description, a computer-implemented method according to an embodiment of the invention is described, and a computerized system according to an embodiment of the invention is described. With respect to the method, the method is desirably realized at least in part as one or more programs running on a computer—that is, as a program executed from a computer-readable medium such as a memory by a processor of a computer. The program is desirably storable on a machine-readable medium such as a floppy disk or a CD-ROM, for distribution and installation and execution on another computer.

Figure 11:
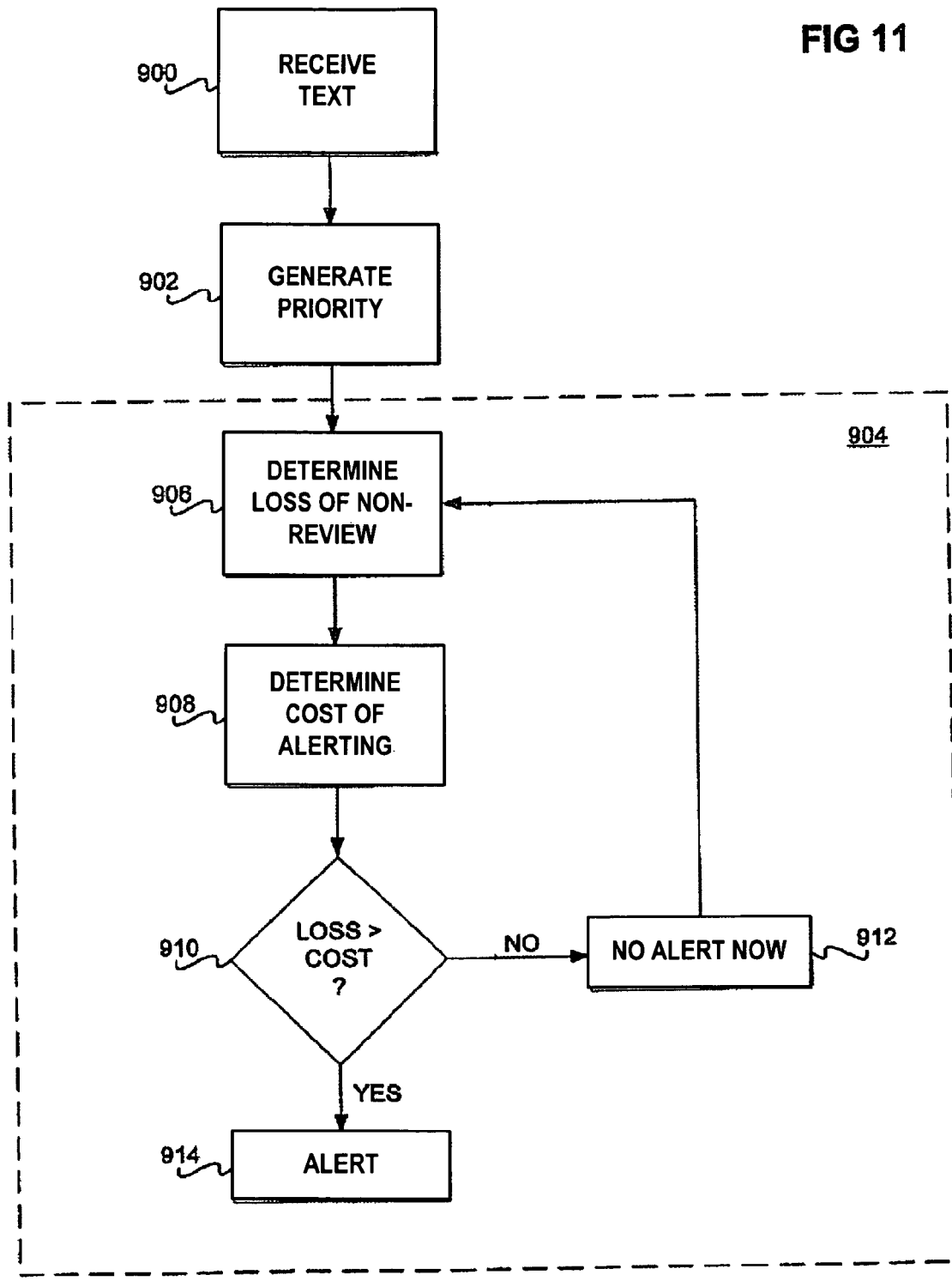
FIG. 11 is a flowchart of a method according to an embodiment of the invention.

Referring to FIG. 11, a flowchart of a method according to an embodiment of the invention is shown. In 900, a text to have a priority thereof assigned is received. The text can be an email message, or any other type of text; the invention is not so limited. In 902, the priority of the text is generated, based on a text classifier, as has been described. Thus, in one embodiment, 902 includes initially training and continually training the text classifier, as has been described.

The priority of the text is then output in 904. In one embodiment, as indicated in FIG. 11, this can include 906, 908, 910, 912 and 914; however, the invention is not so limited. In 906, an expected loss of non-review of the text at a current time t is determined—in one embodiment, by also considering the expected loss of now-review of the text at a future time, based on the assumption that ultimately the user will review the text him or herself, without being alerted, as has been described. In 908, an expected cost of alerting is determined, as has also been described. If the cost is greater than the loss in 910, then no alert is made at the time t, and the method proceeds back to

906, to redetermine the cost-benefit analysis, at a new current time t. This is done because as time progresses, the expected loss may at some point outweigh the alert cost, such that the calculus in 910 changes. Upon the expected loss outweighing the alert cost, then an alert to the user is performed in 914, as has been described.

In one embodiment, the output of the alert is performed as is now described. A user is alerted on an electronic device based on an alert criteria, which indicates when the user should be alerted of a prioritized text. Alert criteria that can be used in conjunction with embodiments of the invention is not limited by the invention; however, in one embodiment, the alert criteria is as described in a further section of the detailed description. The electronic device on which the user is alerted can in one embodiment be a pager or a cellular telephone; however, the invention is not so limited.

In one embodiment, the method alerts a user on an electronic device, such as a pager or a cellular phone, based on an alert criteria that can be made sensitive to information about the location, inferred task, and focus of attention of the user. Such information can be inferred under uncertainty or can be accessed directly from online information sources. One embodiment makes use of information from an online calendar to control the criteria used to make decisions about relaying information to a mobile device.

Figure 12:
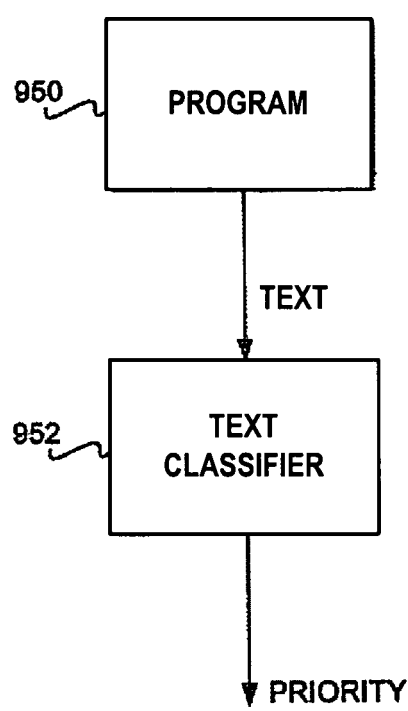
FIG. 12 is a diagram of a system according to an embodiment of the invention.

Referring next to FIG. 12, a diagram of a system according to an embodiment of the invention is shown. The system includes a program 950 and a text classifier 952. Each of the program 950 and the classifier 952 include a computer program executed by a processor of a computer from a computer-readable medium thereof, in one embodiment. However, the invention is not so limited.

The program 950 generates a text for input into the text classifier 952. In one embodiment, the program includes an electronic mail program that receives email, which then serve as the text. The text classifier 952, based on the text, generates a priority thereof, as has been described. In one embodiment, the text classifier 952 is a Bayesian text classifier, while in another embodiment, it is a Support Vector Machine classifier. The priority of the text output by the text classifier 952 can then be used in further conjunction with a cost-benefit analysis, as has been described, to effectuate further output and/or alerting based thereon, as has been described. The invention is not so limited, however.

Referring next to FIG. 13, a diagram of a system according to another embodiment of the invention is shown. The system of FIG. 13 includes an additional component, an alert mechanism 970. Not shown in FIG. 13 are the program 950 and the text classifier 952; however, the alert mechanism 970 is operatively and/or communicatively coupled to the latter. In one embodiment, the mechanism 970 includes a computer program executed by a processor of a computer from a computer-readable medium thereof, but the invention is not so limited.

As shown in FIG. 13, the alert mechanism 970 is communicatively coupled to the Internet 972, which is the network by which the alert mechanism 970 contacts an electronic device to alert the user to a prioritized text, based on an alert criteria, in one embodiment. The network is not limited to the Internet 972, however. Thus, the alert mechanism 970 is able to alert the user of a prioritized text via contacting a pager 974, or a cellular phone 976, or other electronic devices capable of receiving information from over a network such as the Internet 972, and which are not shown in FIG. 13. The invention is not limited as to a particular alert criteria, although in one embodiment, the alert criteria is as described in the next section of the detailed description.

Alert Criteria

In this section of the detailed description, an alert criteria according to one embodiment of the invention is described. The alert criteria is the criteria that governs when and how a user is alerted to a prioritized text. The alert criteria is described with reference to FIG. 14, which is a diagram of a user interface via which alert criteria options can be modified, according to one embodiment of the invention.

Referring now to FIG. 14, in text entry box 980, the user is able to enter the email address of a pager or a cellular phone on which the user would like to be notified of prioritized text. As known within the art, pagers and cellular phones are available that allow for paging by emailing text to an email address assigned to the pager or cellular phone. For example, as shown in FIG. 14, the device has an email address 4255555555@mobile.phoneco.net, where 4255555555 corresponds to the phone number of the cellular phone or the pager number of the pager, as provided by the phone company "phoneco."

It is noted that the alert criteria of FIG. 14 specifically relates to new email messages, but that the invention is not so limited. Three alert criteria are specifically shown in FIG. 14, and are referred to as options 982, 984 and 986. The options are not mutually exclusive, however. That is, the user can select one, two, or all three of the options 982, 984 and 986.

In the option 982, the user is able to specify that the electronic device should be contacted if a new email is received that has a priority greater than a predetermined threshold, and the user has been away from the computer for more than a predetermined amount of time. As shown in FIG. 14, the predetermined threshold is a priority of 85, while the predetermined amount of time is 75 minutes. Thus, if it is determined that the priority of an email message is greater than 85, and that the user has been away from the computer for more than 75 minutes, then the user's electronic device will be alerted, consistent with the other options 984 and/or 986 if selected.

In the option 984, the user is able to specify that the electronic device should be contacted only when the current time is within a predetermined range of times. As shown in FIG. 14, the predetermined range of times is between 8:15 a.m. and 7:30 p.m. Thus, if it is determined that the current time is between 8:15 a.m. and 7:30 p.m., then the user's electronic device will be alerted, consistent with the other options 982 and/or 986 if selected.

In the option 986, the user is able to specific that if the user is in a meeting—for example, as determined by examining a schedule of the user—then the user should only be notified if the priority is greater than a predetermined meeting threshold. In general, this meeting threshold is desirably greater than the threshold specified in the option 982—the purpose of this greater threshold is to indicate that the user is receptive to notification of email messages greater than a particular priority in usual circumstances, but that the user is receptive to notification of email messages during meetings only if they have a priority that is unusually great. As shown in FIG. 14, then, the predetermined meeting threshold is a priority of 95, which is higher than the predetermined threshold of 85 in the option 982. Thus, if it is determined that the user is in a meeting, and a message is received having a threshold greater than 95, then the user is alerted via his or her electronic device.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computer-implemented method comprising:
    operating at least one processor in a computer to perform acts of:
        receiving a text;
        monitoring user activity related to previously received texts, said monitoring including at least one of determining whether the user opens texts immediately upon receipt or observing an order in which the user reads the previously received texts;
        generating a priority of the received text, the priority determined at least in part on the monitored user activity, said generating including generating the priority based on at least one of whether the user opens texts immediately upon receipt or an order in which the user reads the previously received texts;
        determining an alert criteria based in part on the priority of the received text; and
        alerting a user on an electronic device based on the alert criteria.

2. The method of claim 1, wherein the alert criteria is sensitive to information about location, inferred task, and focus of attention of the user.

3. The method of claim 2, wherein the information is inferred under uncertainty.

4. The method of claim 2, wherein the information is accessed directly from online information sources.

5. The method of claim 4, where the online information sources comprise an online calendar.

6. The method of claim 1, wherein receiving a text comprises receiving an email.

7. The method of claim 1, wherein alerting a user on an electronic device comprises alerting the user on the electronic device comprising a pager.

8. The method of claim 1, wherein alerting a user on an electronic device comprises alerting the user on the electronic device comprising a cellular phone.

9. The method of claim 1, wherein alerting a user on an electronic device based on an alert criteria comprises:
    determining whether the priority of the text is greater than a predetermined threshold; and, alerting the user upon determining that the priority of the text is greater than the predetermined threshold.

10. The method of claim 1, wherein alerting a user on an electronic device based on an alert criteria comprises:
    determining whether the priority of the text is greater than a predetermined threshold;
    determining whether the user has been away for more than a predetermined amount of time; and,
    upon determining that the priority of the text is greater than the predetermined threshold and that the user has been away for more than the predetermined amount of time, alerting the user.

11. The method of claim 1, wherein alerting a user on an electronic device based on an alert criteria comprises:
    determining whether a current time is within a predetermined range of times; and,
    upon determining that the current time is within the predetermined range of times, alerting the user.

12. The method of claim 1, wherein alerting a user on an electronic device based on an alert criteria comprises:
    determining whether the user is in a meeting;
    upon determining that the user is in a meeting, determining whether the priority is greater than a predetermined meeting threshold; and,
    upon determining that the priority is greater than the predetermined meeting threshold, alerting the user.

13. A computer-implemented method comprising:
    operating at least one processor in a computer to perform acts of:
        monitoring user review of texts, said monitoring including at least one of determining whether the user reads a text immediately upon receipt or observing an order in which the user reads the texts;
        training a text classifier based on said monitoring user review of texts, said training including training the text classifier based on at least one of whether the user opens texts immediately upon receipt or an order in which the user reads the previously received texts;
        receiving a text comprising an email;
        generating a priority of the text based on the text classifier; and
        alerting the user when the priority of the text meets a predefined criterion.

14. The computer-implemented method of claim 13, wherein:
    the at least one processor in the computer is further configured to perform the act of displaying a user interface with a window comprising input fields; and
    user input comprising an identifier for the electronic device and user input comprising indications for a plurality of alert criteria are entered through the input fields.

15. A machine-readable storage device having instructions stored thereon for execution by a processor to perform a method comprising:
    monitoring user activity with regard to previously received texts, said monitoring including at least one of determining whether the user opens texts immediately upon receipt or observing an order in which the user reads the previously received texts;
    receiving a text;
    generating a priority of the received text based on the monitored user activity, said generating including generating the priority based on at least one of whether the user opens texts immediately upon receipt or an order in which the user reads the previously received texts;
    determining an alert criteria based in part on the priority of the received text; and
    alerting a user on an electronic device based on the alert criteria.

16. The machine-readable storage device of claim 15, wherein alerting a user when the priority of the text meets the predefined criterion comprises:
    determining whether the priority of the text is greater than a predetermined threshold; and,
    alerting the user upon determining that the priority of the text is greater than the predetermined threshold.

17. The machine-readable storage device of claim 15, wherein alerting a user when the priority of the text meets the predefined criterion comprises:
    determining whether the priority of the text is greater than a predetermined threshold;
    determining whether the user has been away for more than a predetermined amount of time; and,
    upon determining that the priority of the text is greater than the predetermined threshold and that the user has been away for more than the predetermined amount of time, alerting the user.

18. The machine-readable storage device of claim 15, wherein alerting a user when the priority of the text meets the predefined criterion comprises:
- determining whether the priority of the text is greater than a predetermined threshold;
- determining whether the user has been away for more than a predetermined amount of time;
- determining whether a current time is within a predetermined range of times; and,
- upon determining that the priority of the text is greater than the predetermined threshold, that the user has been away for more than the predetermined amount of time, and that the current time is within the predetermined range of times, alerting the user.

19. The machine-readable storage device of claim 15, wherein alerting a user when the priority of the text meets the predefined criterion comprises:
- determining whether the user is in a meeting;
- upon determining that the user is in a meeting, determining whether the priority of the text is greater than a predetermined meeting threshold; and,
- upon determining that the priority of the text is greater than the predetermined meeting threshold, alerting the user.

20. The machine-readable storage device of claim 15, wherein receiving a text comprises receiving an email.

* * * * *